June 25, 1968 W. S. TOUCHMAN 3,389,843
INTERMITTENT MOTION APPARATUS
Original Filed Aug. 3, 1964 20 Sheets-Sheet 1

INVENTOR
WILLIAM S. TOUCHMAN
BY
HIS ATTORNEYS

June 25, 1968 W. S. TOUCHMAN 3,389,843
INTERMITTENT MOTION APPARATUS
Original Filed Aug. 3, 1964 20 Sheets-Sheet 2
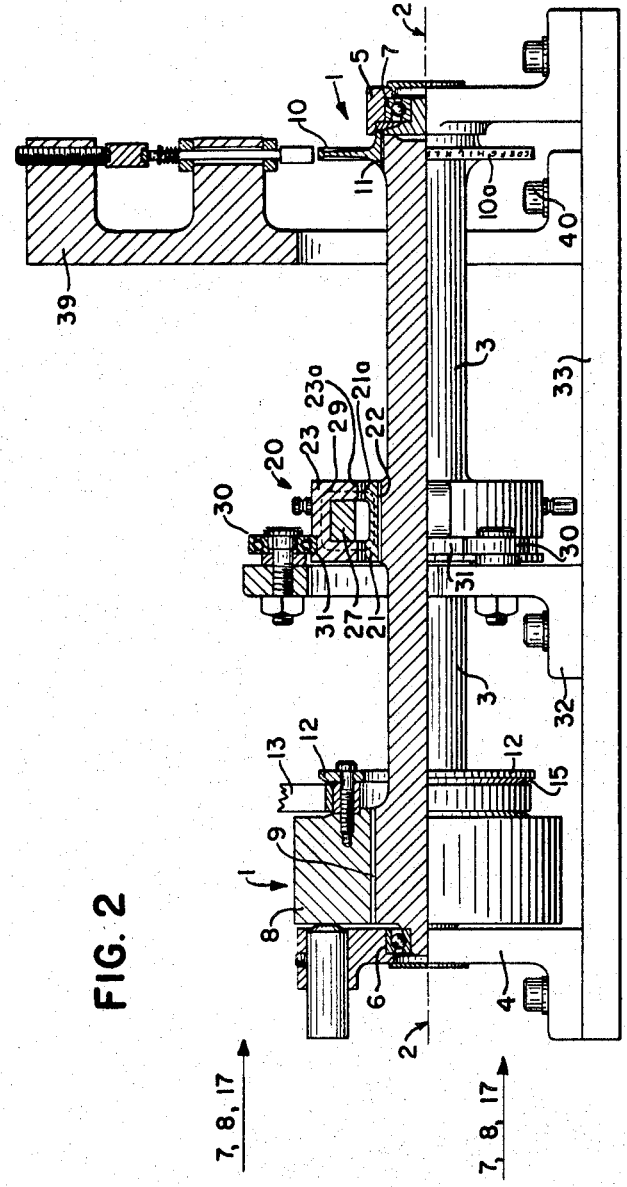
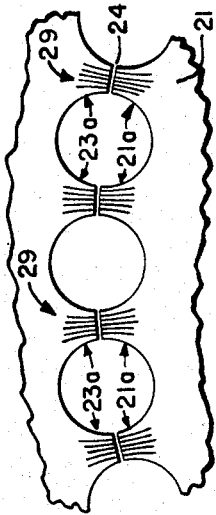
INVENTOR
WILLIAM S. TOUCHMAN
BY Louis A. Kline
John J. Callahan
HIS ATTORNEYS

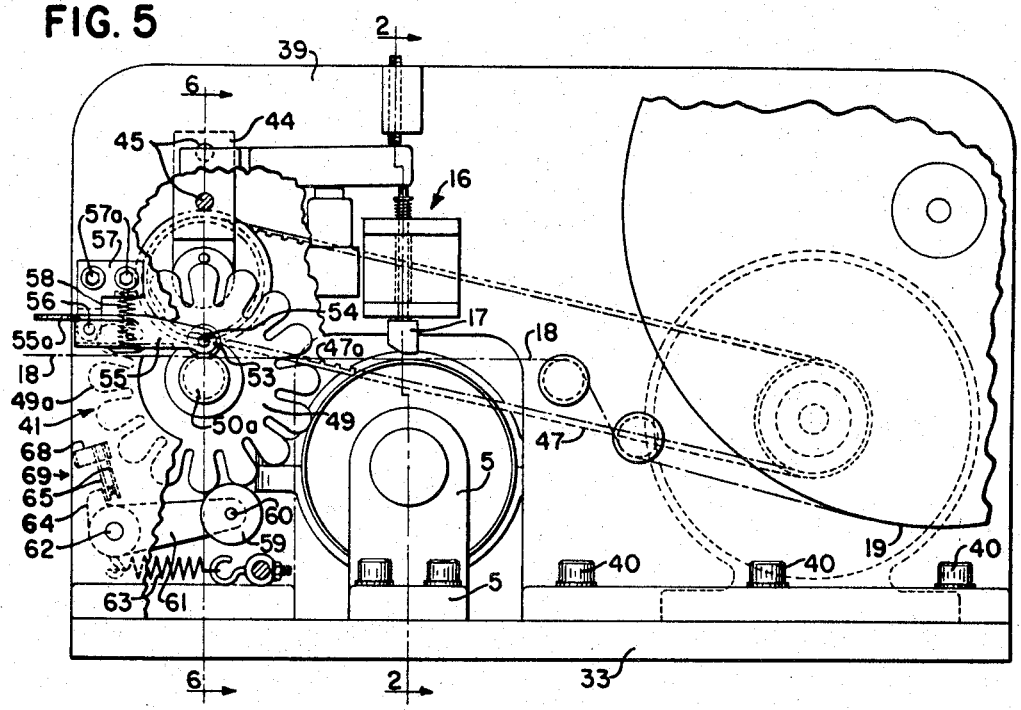

June 25, 1968 W. S. TOUCHMAN 3,389,843
INTERMITTENT MOTION APPARATUS
Original Filed Aug. 3, 1964 20 Sheets-Sheet 4

INVENTOR
WILLIAM S. TOUCHMAN
BY
HIS ATTORNEYS

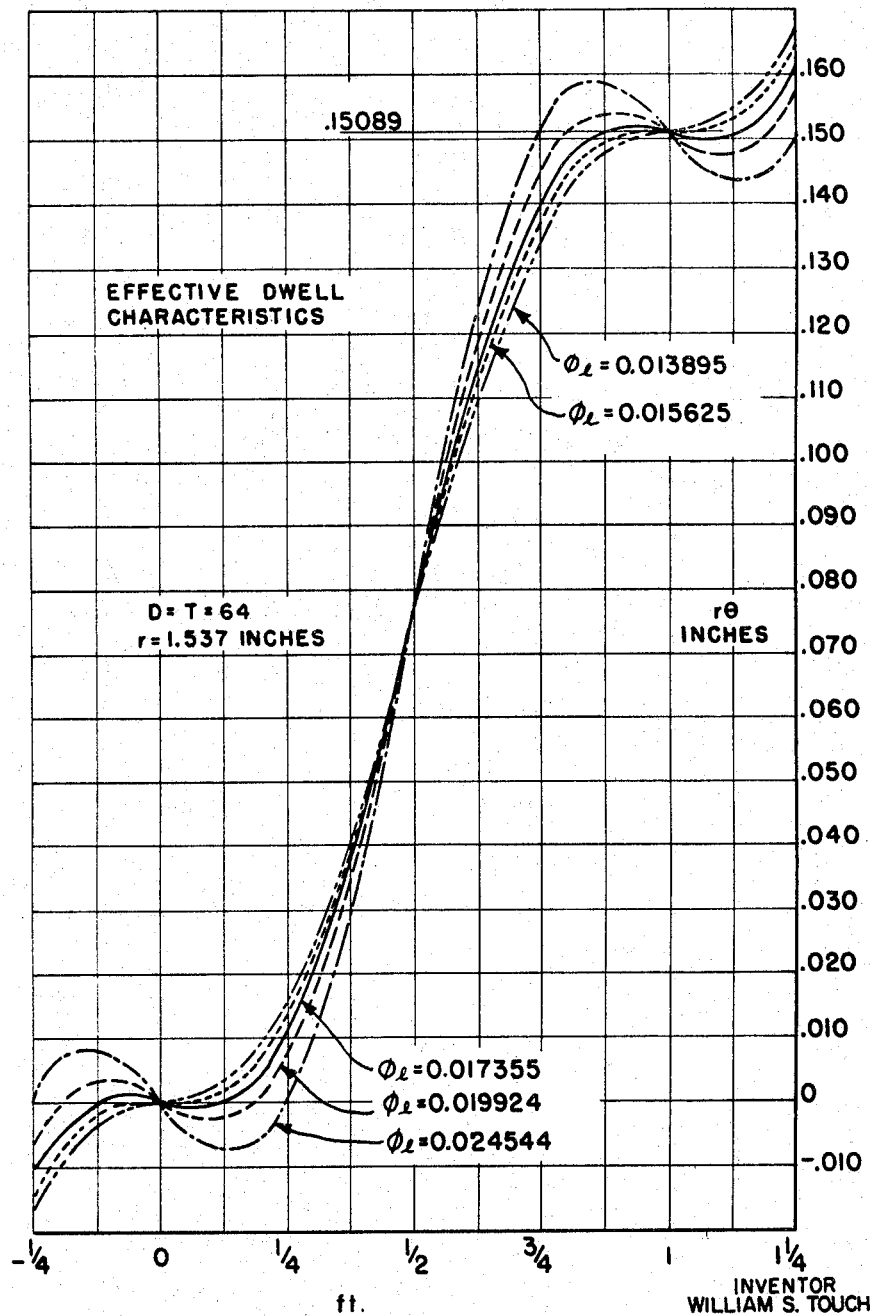

June 25, 1968 W. S. TOUCHMAN 3,389,843
INTERMITTENT MOTION APPARATUS
Original Filed Aug. 3, 1964 20 Sheets-Sheet 6

FIG. 10

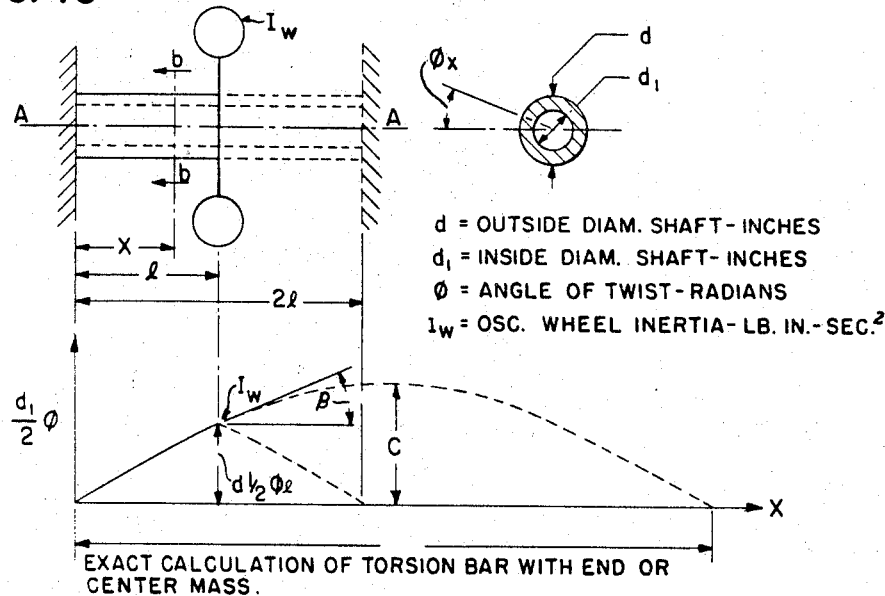

$d$ = OUTSIDE DIAM. SHAFT-INCHES
$d_1$ = INSIDE DIAM. SHAFT-INCHES
$\phi$ = ANGLE OF TWIST-RADIANS
$I_w$ = OSC. WHEEL INERTIA-LB. IN.-SEC.$^2$

EXACT CALCULATION OF TORSION BAR WITH END OR CENTER MASS.

FIG. 11

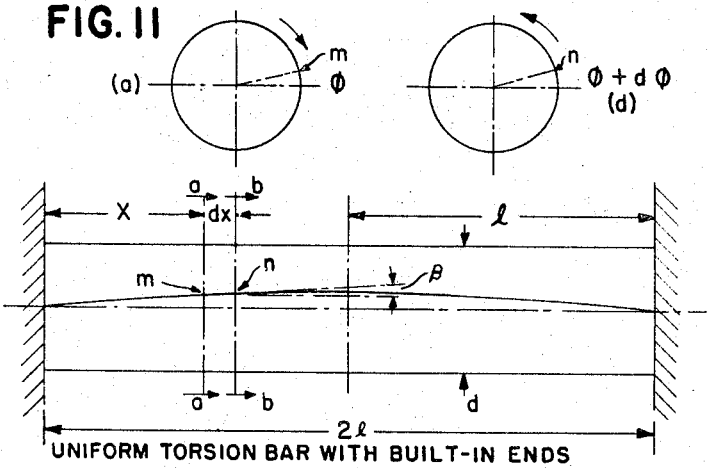

UNIFORM TORSION BAR WITH BUILT-IN ENDS

FIG. 12

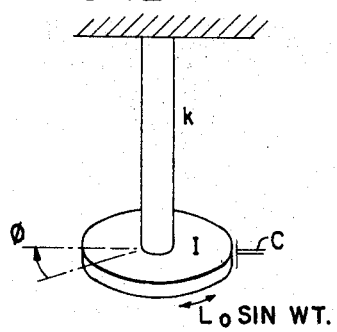

FIG. 13

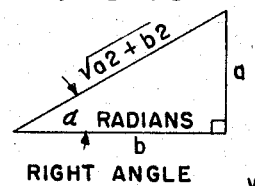

RIGHT ANGLE

INVENTOR
WILLIAM S. TOUCHMAN
BY Louis A. Kline
John J. Callahan
HIS ATTORNEYS

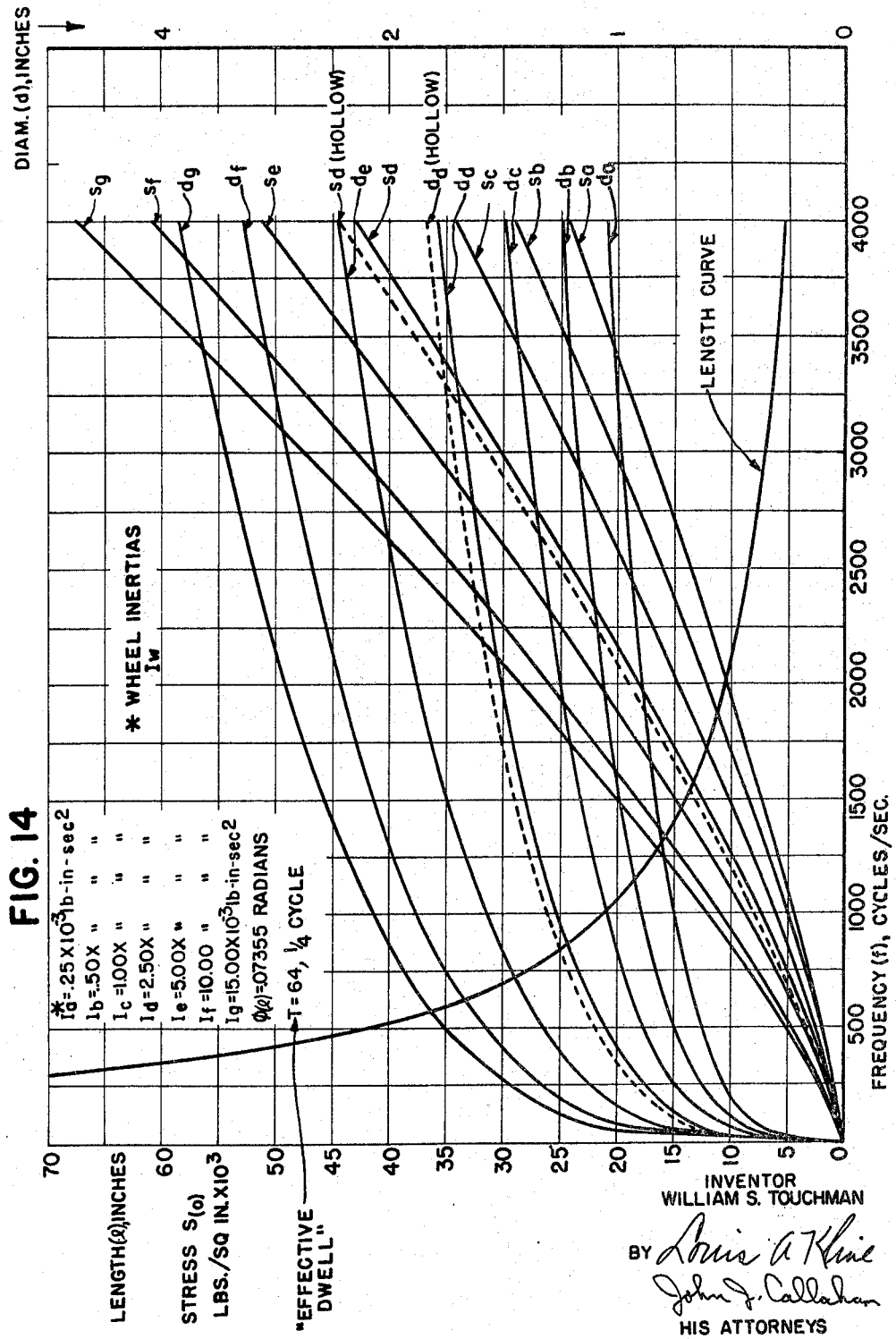

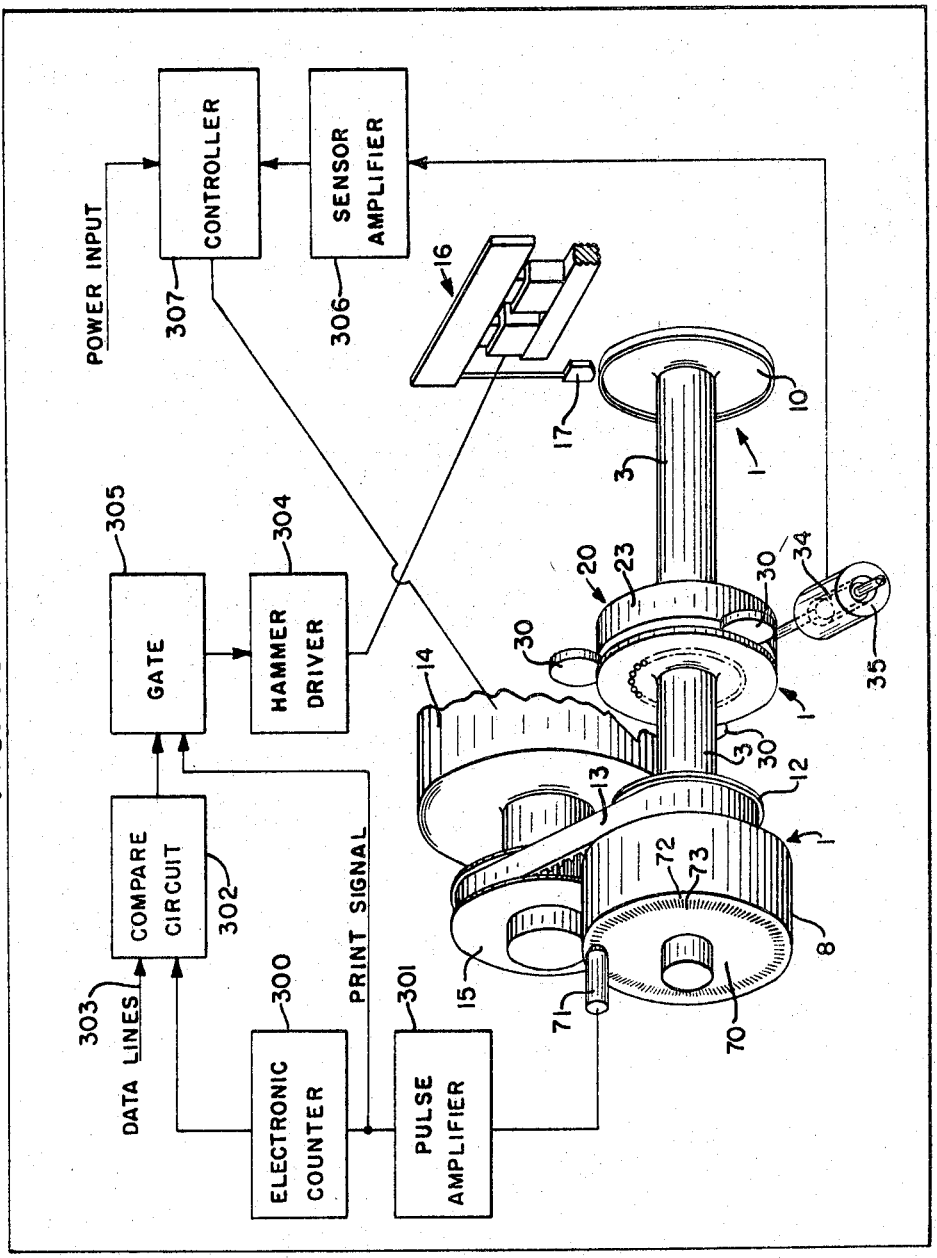

INVENTOR
WILLIAM S. TOUCHMAN
HIS ATTORNEYS

June 25, 1968

W. S. TOUCHMAN 3,389,843

INTERMITTENT MOTION APPARATUS

Original Filed Aug. 3, 1964

INVENTOR
WILLIAM S. TOUCHMAN

BY *Louis A. Kline*

*John J. Callahan*

HIS ATTORNEYS

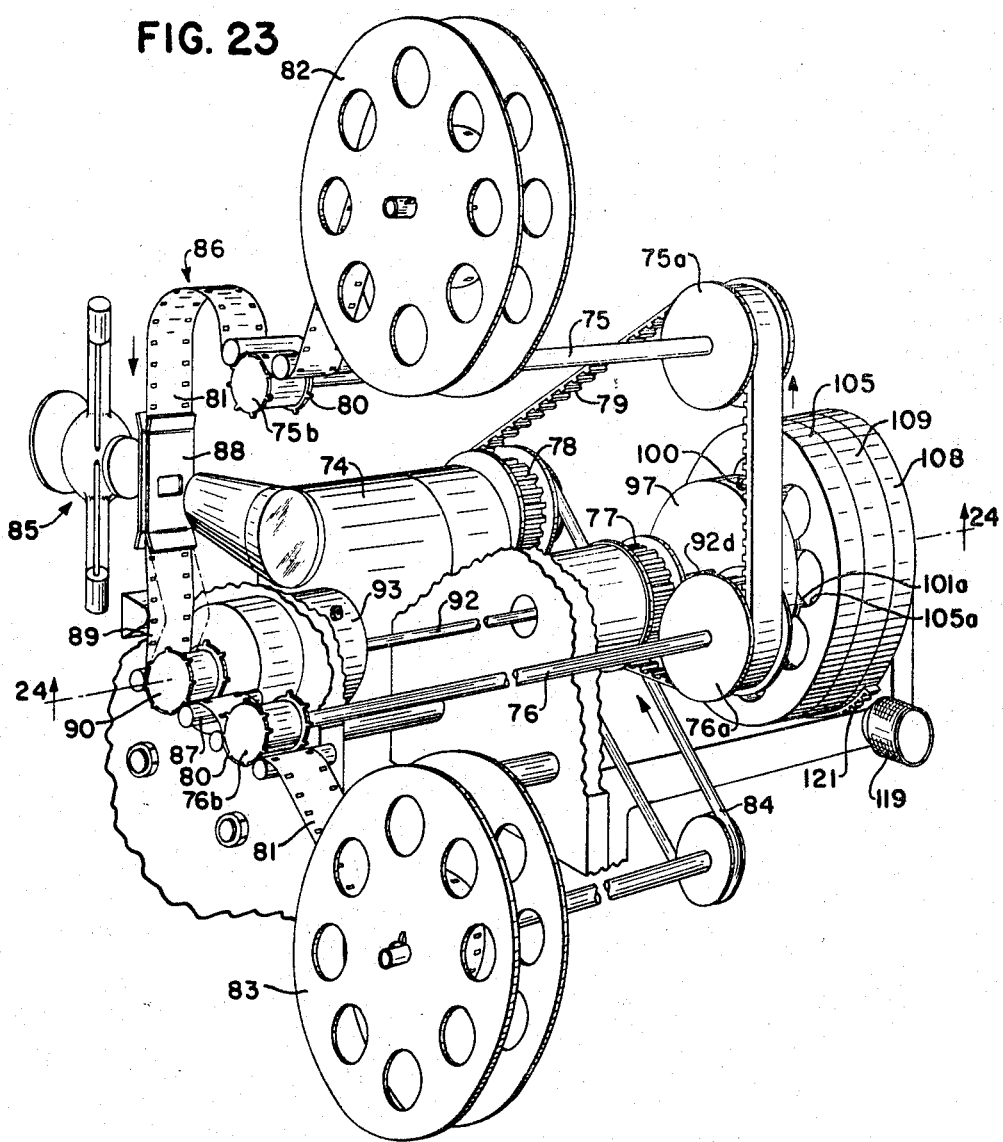

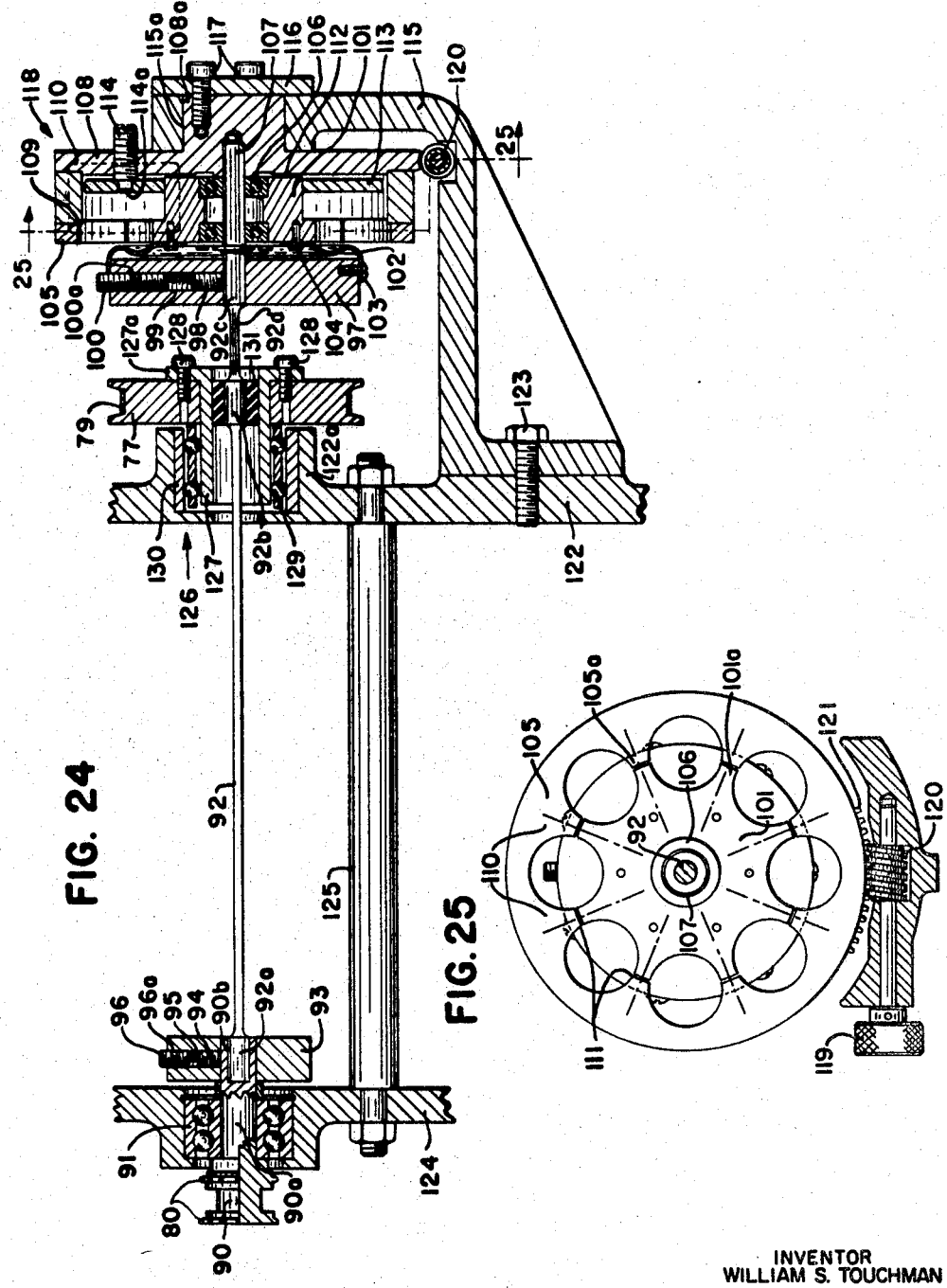

June 25, 1968 W. S. TOUCHMAN 3,389,843
INTERMITTENT MOTION APPARATUS
Original Filed Aug. 3, 1964 20 Sheets-Sheet 15

INVENTOR
WILLIAM S. TOUCHMAN
BY
HIS ATTORNEYS

June 25, 1968   W. S. TOUCHMAN   3,389,843
INTERMITTENT MOTION APPARATUS
Original Filed Aug. 3, 1964   20 Sheets-Sheet 19

INVENTOR
WILLIAM S. TOUCHMAN
BY Louis A. Kline
John J. Callahan
HIS ATTORNEYS

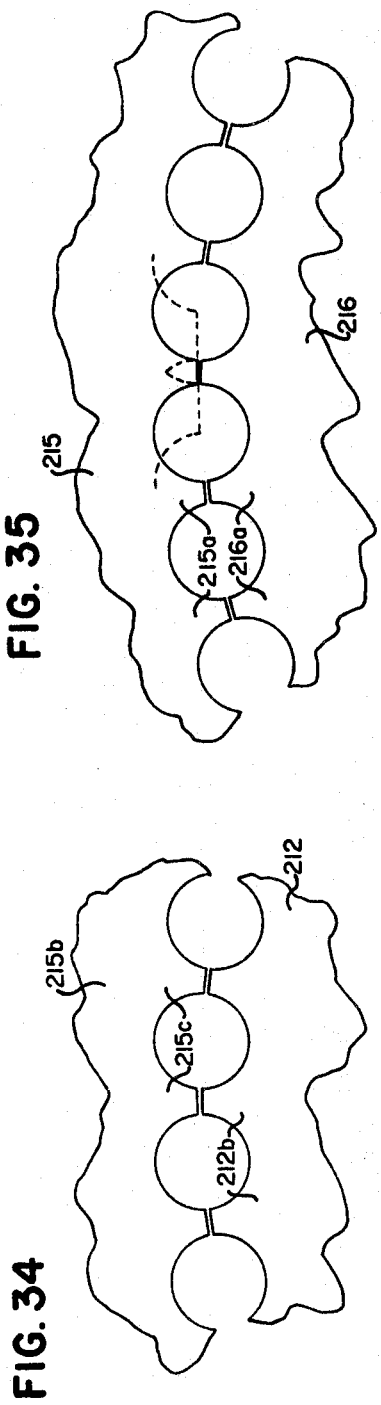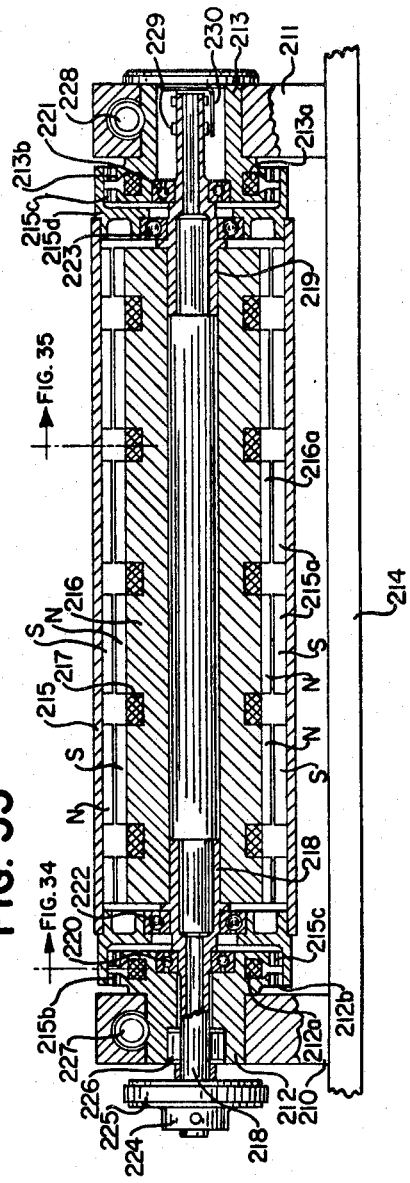

United States Patent Office 3,389,843
Patented June 25, 1968

3,389,843
INTERMITTENT MOTION APPARATUS
William S. Touchman, Dayton, Ohio, assignor to The National Cash Register Company, Dayton, Ohio, a corporation of Maryland
Original application Aug. 3, 1964, Ser. No. 387,085, now Patent No. 3,309,988. Divided and this application Jan. 16, 1967, Ser. No. 609,378
6 Claims. (Cl. 226—134)

ABSTRACT OF THE DISCLOSURE

An intermittent motion device comprising a rotatable system having a certain resonant frequency. The rotatable system includes an output member capable of oscillation about the axis of rotation of the rotatable system. A uniform rotation of a portion of the rotatable system is effected. Oscillator means causes the rotatable system to oscillate substantially at its resonant frequency, whereby the oscillations and uniform rotation of the rotatable system are superposed, so that the output member undergoes alternate advances and effective dwells.

---

The present application is a division of co-pending United States patent application Ser. No. 387,085, filed Aug. 3, 1964, now Patent No. 3,309,988 by William S. Touchman, and assigned to the same assignee as the present divisional application and related generally to intermittent motion devices.

The present invention relates to devices for intermittently advancing a record member.

One embodiment of the present invention described hereinafter is a device for intermittently advancing a record member, which device is incorporated in a motion picture projector. In the more common type of motion picture projectors, the film is indexed twenty-four times per second. Also, in high-speed movie cameras the normal indexing speed is sixty-four frames per second, while some cameras can be operated at a top speed of 128 frames per second. In high-speed cameras faster than 128 frames per second, the film moves continuously, and there is provided compensation for image movement by a rotating optical device. In this application of the present invention, an intermittent motion device is described hereafter which is capable of 2,800 indexes or cycles per second, consisting of only one moving part and with no mating or sliding elements causing wear or friction.

The present invention comprises a device for intermittently advancing or feeding a record member, which device comprises rotatable drive means, an advancing or feed roll mounted for movement by the drive means, means for continuously rotating the drive means at a substantially constant speed, and oscillating means for oscillating the drive means substantially at the resonant frequency of the device to cause the advancing roll to be oscillated, thereby advancing the record member intermittently.

Accordingly, it is an object of the present invention to provide a device for intermittently advancing a record member having high-speed advancing capabilities.

The novel features that are considered characteristic of this invention are set forth with particularity in the appended claims. The invention itself, however, as to both its organization and its method of operation, as well as additional objects and advantages thereof, will best be understood from the following description when read in connection with the accompanying drawings, in which:

FIGURE 2 is a view, partly in elevation and partly in section, mainly of the intermittent motion mechanism, taken along line 2—2 of FIGURE 1 and along line 2—2 of FIGURE 5;

FIGURE 3 is a sectional view taken along line 3—3 of FIGURE 1, showing details of the magnetic oscillator and error-sensing device;

FIGURE 4 is an enlarged view of a portion of FIGURE 3, showing the rotor and stator teeth of the magnetic oscillator;

FIGURE 5 is a front elevation of the serial printer taken along line 5—5 of FIGURE 1, showing the print hammer actuator and paper feed mechanism;

FIGURE 6 is a sectional view taken along line 6—6 of FIGURE 5, showing details of the paper advance mechanism;

Figure 7:
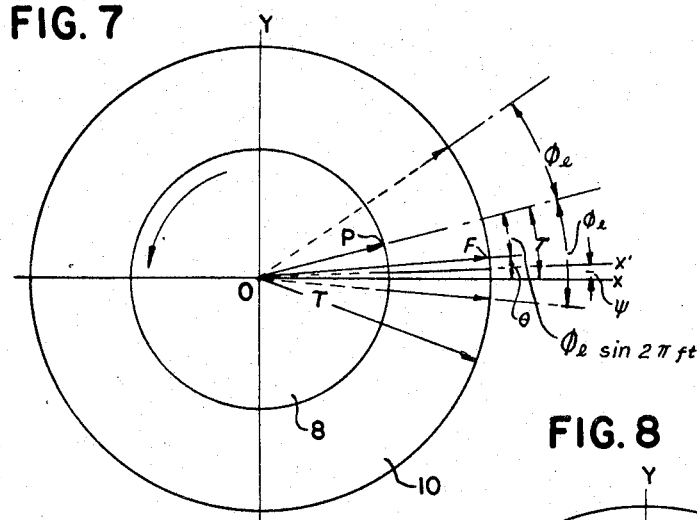
FIGURE 7 is a schematic view taken along line 8—8 of FIGURE 2 for the purpose of describing the effective dwell cycle of the present invention.
Figure 8:
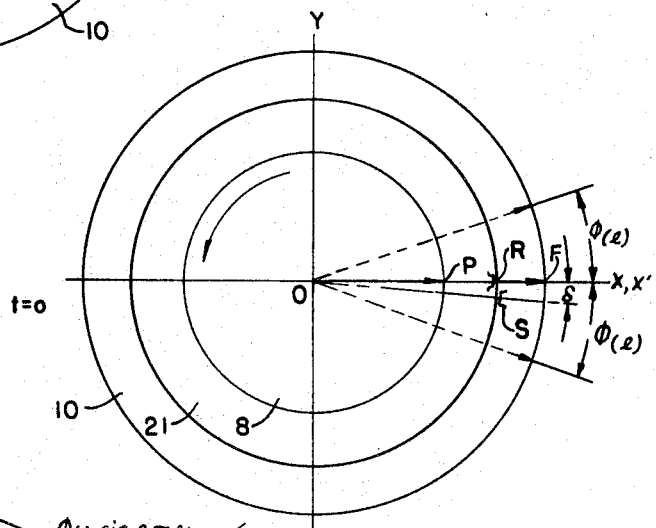
FIGURE 8 is identical to FIGURE 7 except at time=0.
Figure 17:
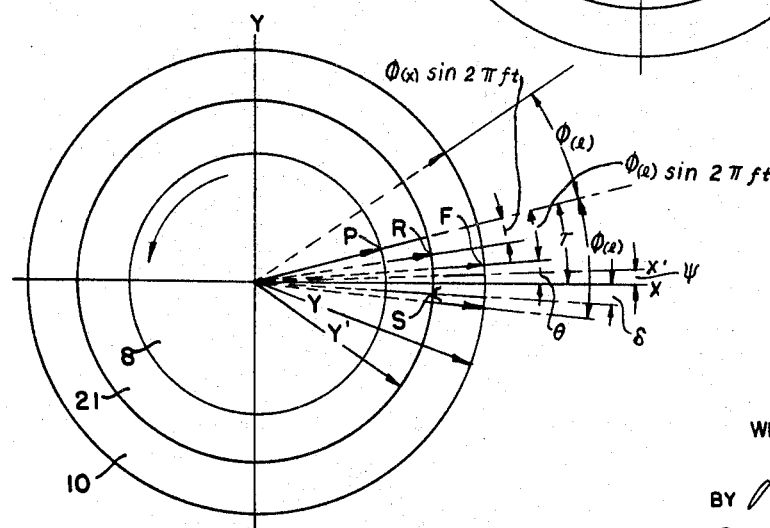
Figure 15:
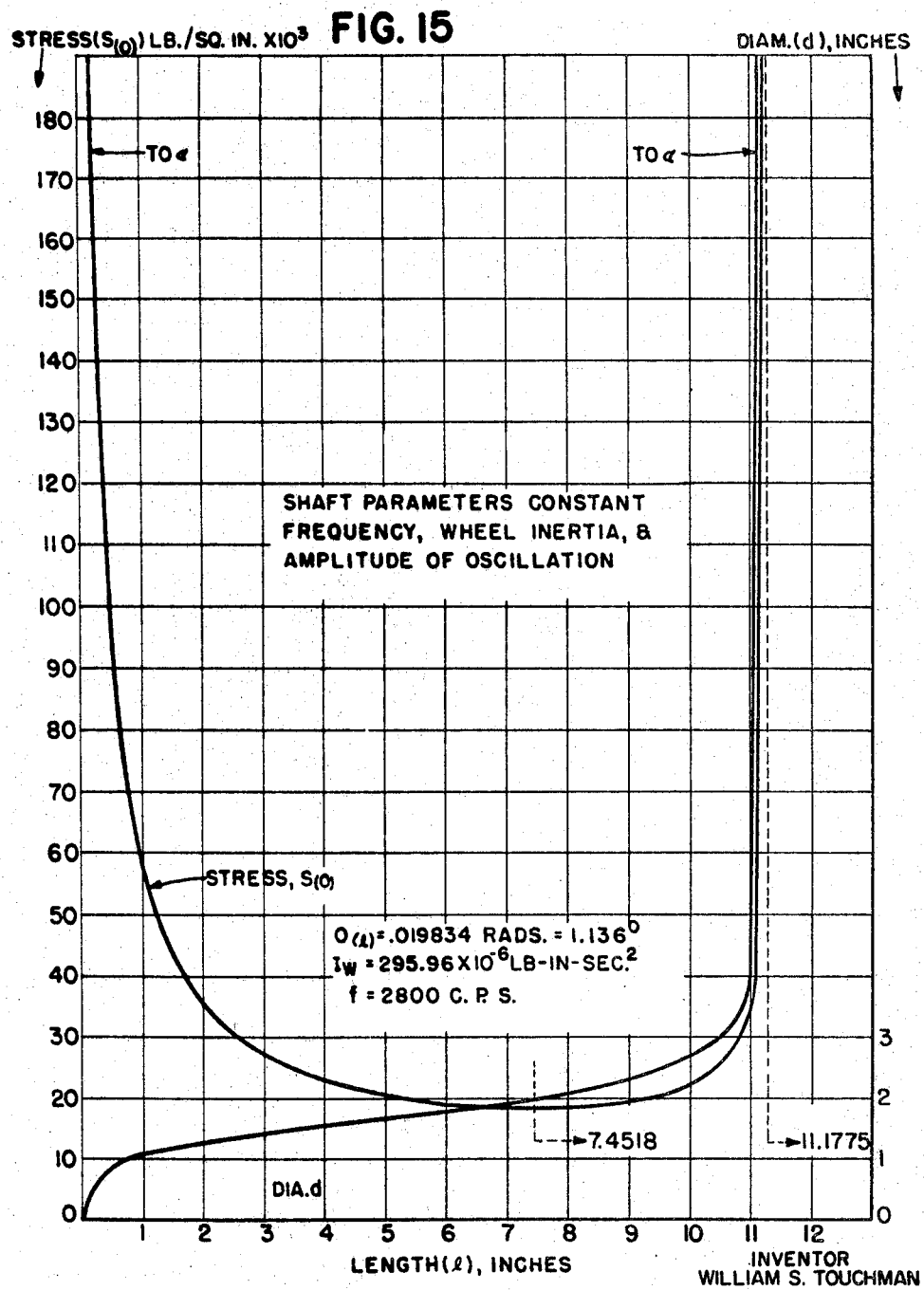
Figure 20:
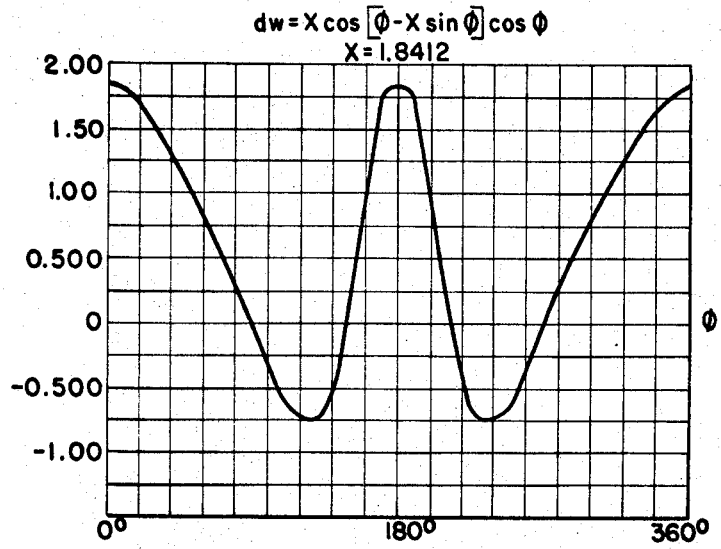
Figure 19:
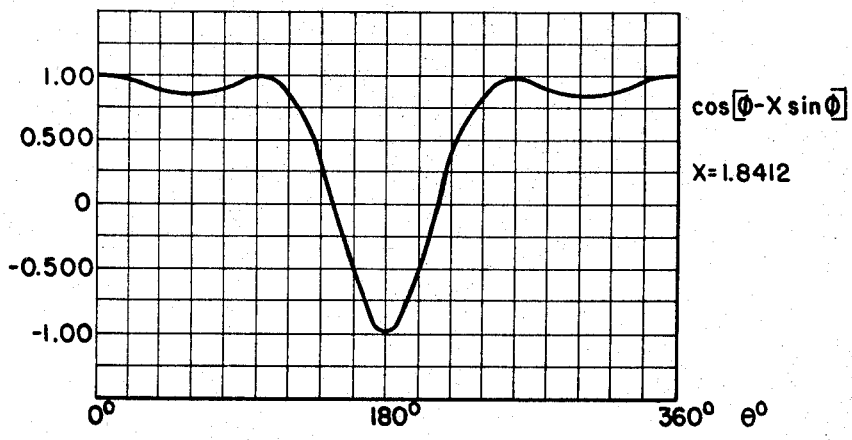
Figure 21:
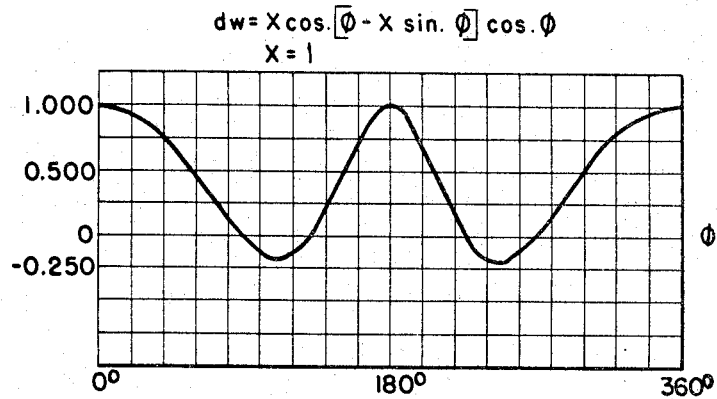
Figure 22:
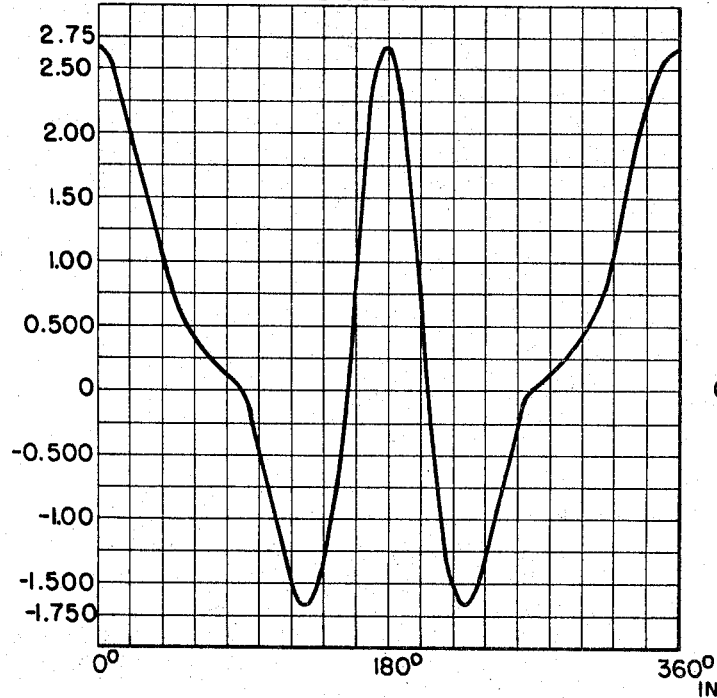
Figure 26A:
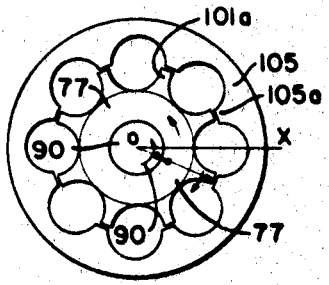
Figure 26B:
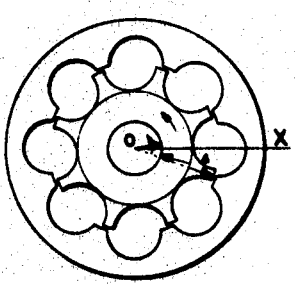
Figure 26C:
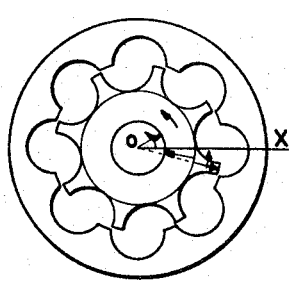
Figure 26D:
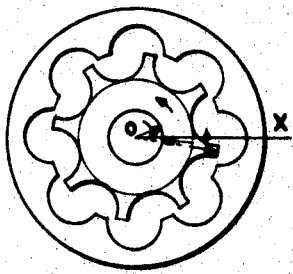
Figure 26E:
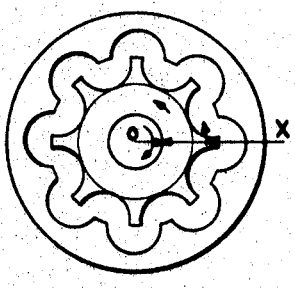
Figure 26F:
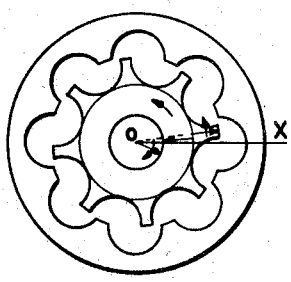
Figure 26G:
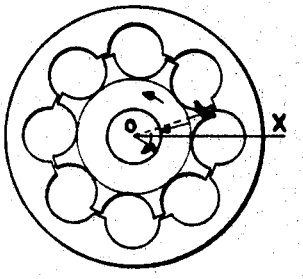
Figure 26H:
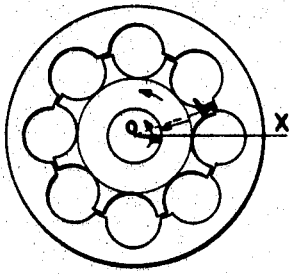
Figure 26I:
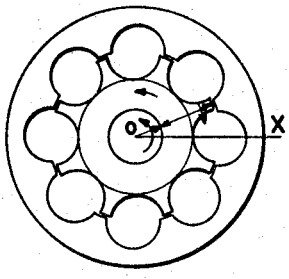
Figure 27:
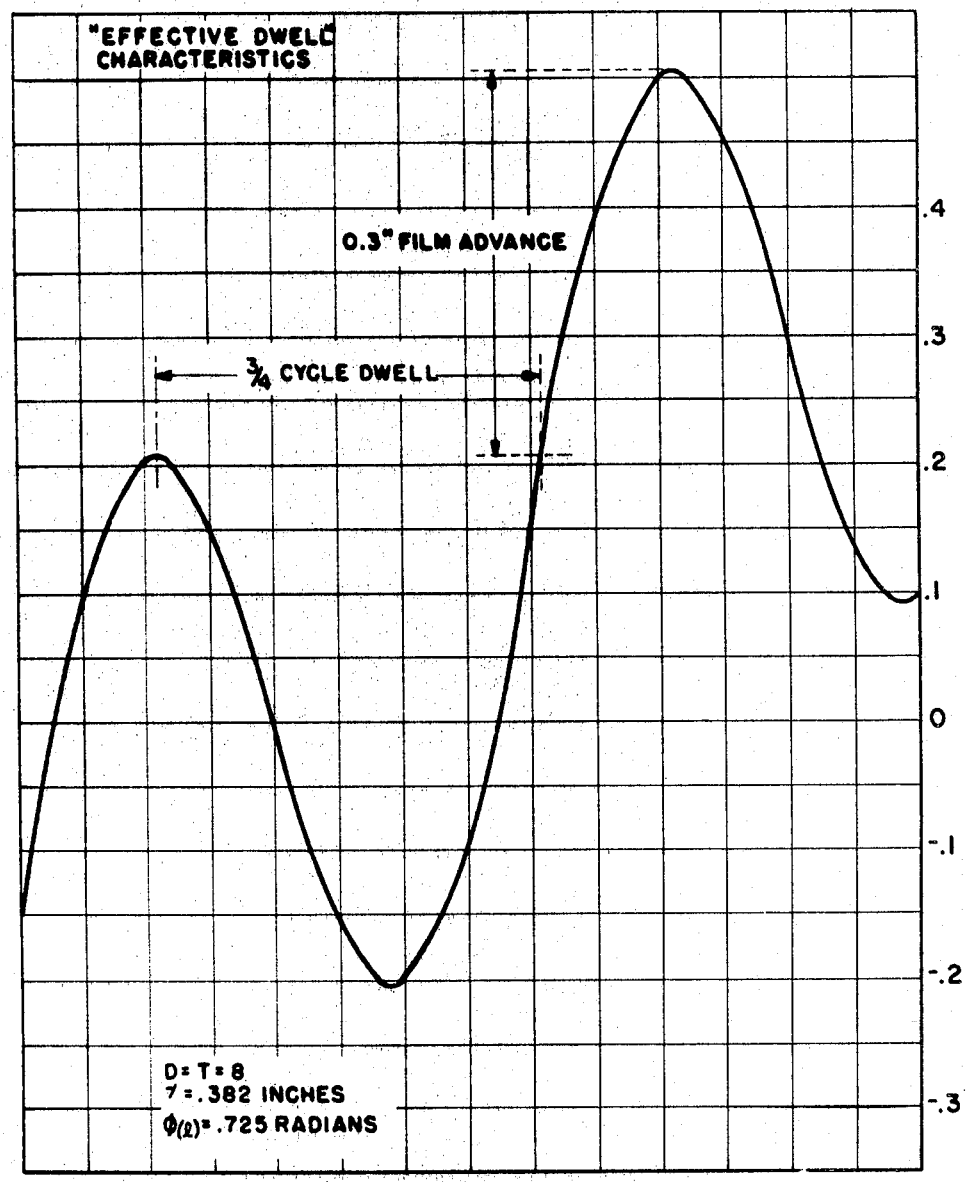
Figure 28:
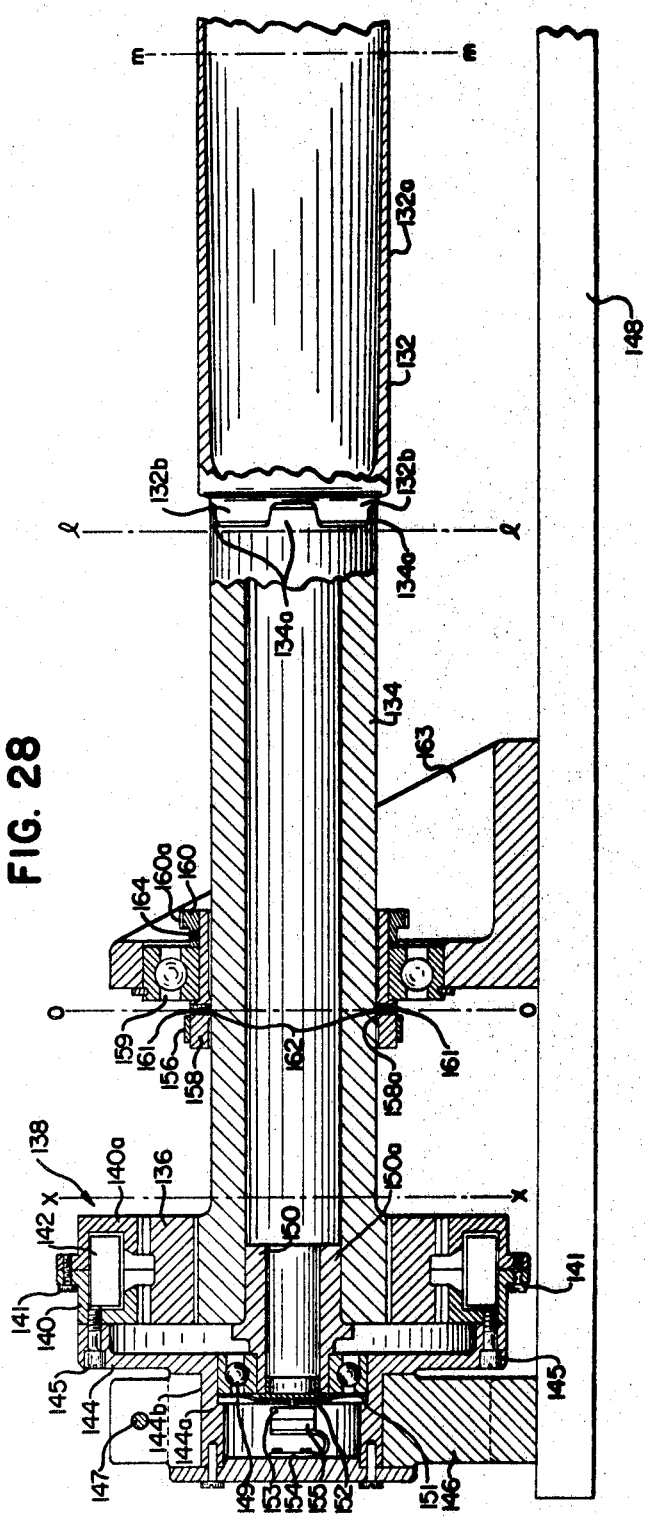
Figure 29:
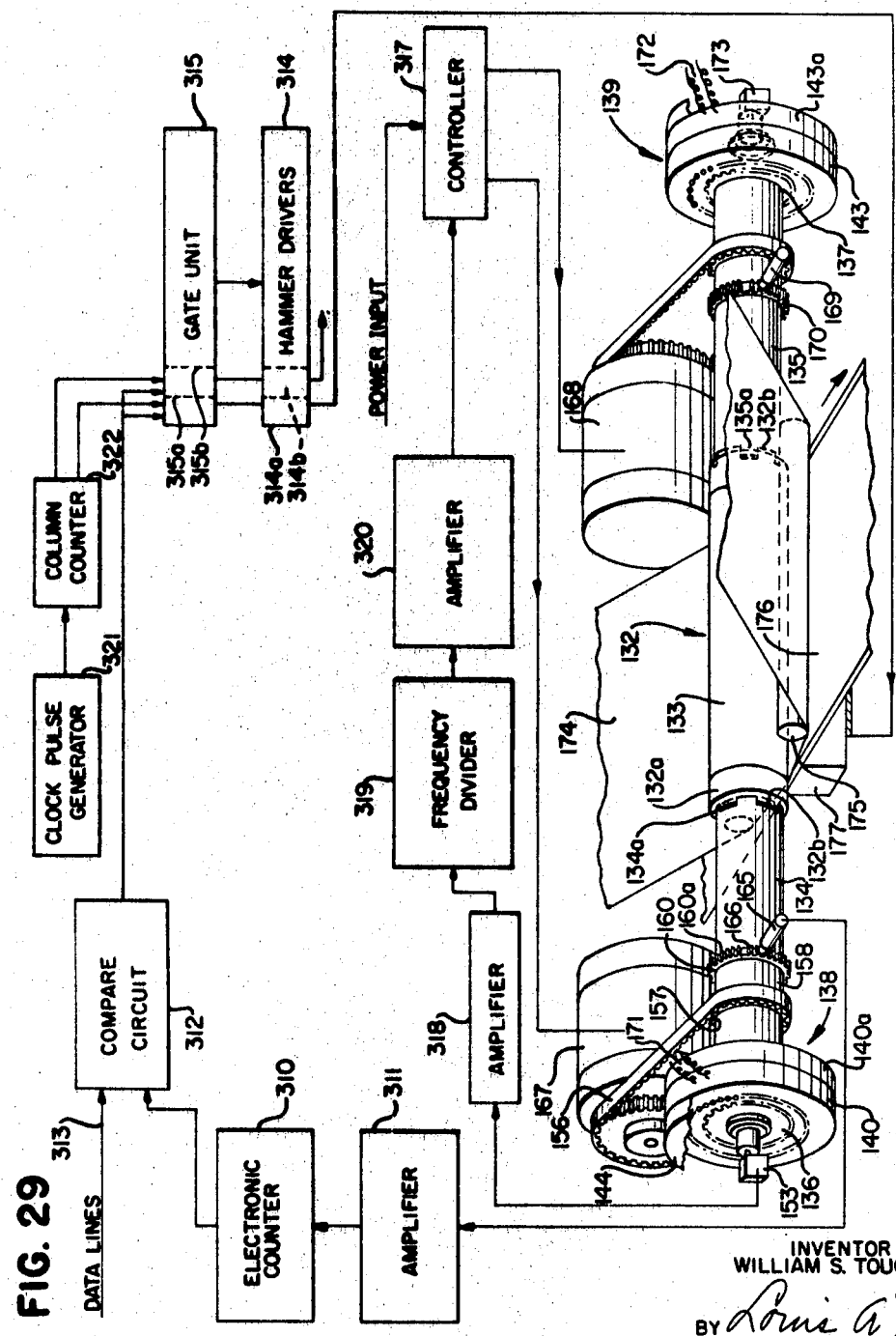
Figure 30:
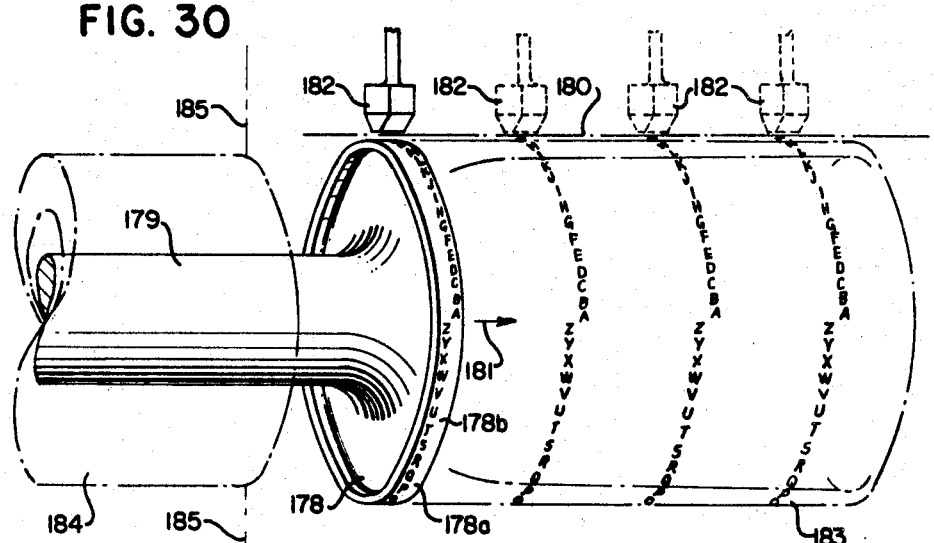
Figure 31:
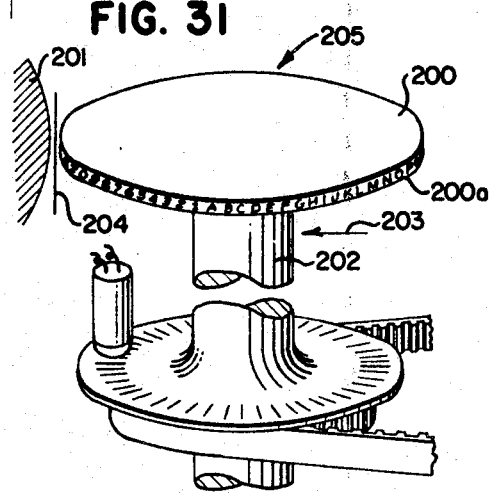
Figure 32:
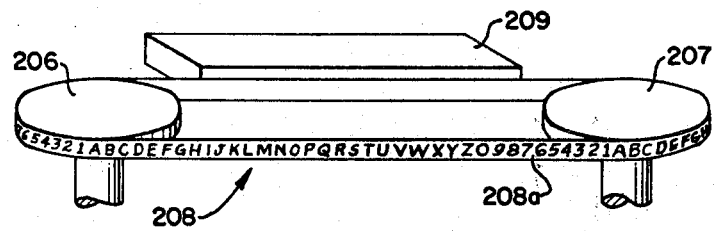

FIGURE 9 consists of five plotted curves illustrating effective dwell characteristics of an oscillating wheel design;

FIGURE 10 is a three-part drawing used to explain the exact calculation of a torsion bar with end or center mass;

FIGURE 11 is a three-part drawing used to explain the exact calculation of a uniform torsion bar with built-in ends;

FIGURE 12 is an inclined view of a single-degree-of-freedom torsional system used in developing equations for the many-degree-of-freedom system of the torsion bar with end or center mass;

FIGURE 13 is a view of a right triangle used as an aid in transforming a transcendental equation into an algebraic equation;

FIGURE 14 shows design curves of "idealized shaft parameters" for sixty-four effective dwells per revolution;

FIGURE 15 shows variations of shaft parameters when frequency, wheel inertia, and amplitude of oscillation are held constant;

FIGURE 16 is a combination schematic and block diagram of the electronic servo control for the serial printer of FIGURES 1 through 6;

FIGURE 17 is a schematic view similar to FIGURES 7 and 8 for the purpose of describing the energy input into the torsionally vibrating system and to explain the servo control system;

FIGURE 18 shows nine progressive views useful in explaining the action of the magnetic oscillator;

FIGURE 19 is a plot of the relative torque versus cycle time for the torsionally oscillating system;

FIGURES 20, 21, and 22 are plots of the work function for three parameter values of the torsionally oscillating system;

FIGURE 23 is a perspective view of an intermittent motion device in accordance with the invention for incrementally feeding a film strip in a motion picture projector;

FIGURE 24 is a view along line 24—24 of FIGURE 23, showing details of the intermittent motion incremental film advance mechanism;

FIGURE 25 is a sectional view along line 25—25 of FIGURE 24, showing the excitation teeth and stator positioning or framing device;

FIGURES 26(a) to 26(i) inclusive show nine progressive views illustrating the effective dwell action;

FIGURE 27 consists of a plotted curve illustrating the actual film displacement in the motion picture projector embodiment of the invention;

FIGURE 28 is a cross-sectional view of the intermittent motion device embodied in a multi-column or drum-type high-speed printer;

FIGURE 29 is a combination schematic and block diagram of the electronic servo control of the drum printer of FIGURE 28;

FIGURE 30 is a view illustrating the manner in which the intermittent motion device can be embodied in a drum printer having type characters in the form of a helix;

FIGURE 31 is a view illustrating the manner in which the intermittent motion device can be embodied in a typewriter or similar printing mechanism;

FIGURE 32 is a view illustrating the manner in which the intermittent motion device can be embodied in a printer of the chain type;

FIGURE 33 is a cross-sectional view of a further embodiment of the intermittent motion device showing its incorporation in a drum-type printer similar to the printer of FIGURES 28 and 29;

FIGURE 34 is an enlarged view of a part of one of the pair of excitation devices which are utilized to excite the drum at its resonant frequency; and FIGURE 35 is an enlarged view of the magnetic spring teeth of both the drum and its associated cylinder member.

The principles of the intermittent motion device of the instant invention can be readily understood from a description of the serial printer embodiment illustrated in FIGURES 1 through 6. The primary element of this intermittent motion device is a combination of circular masses generally indicated at 1 (FIGURE 2), all of which rotate and are symmetrical about the indicated center line 2. In FIGURE 2, all mechanism below the center line 2 is shown in elevation, while everything above is shown in section.

Figure 1:
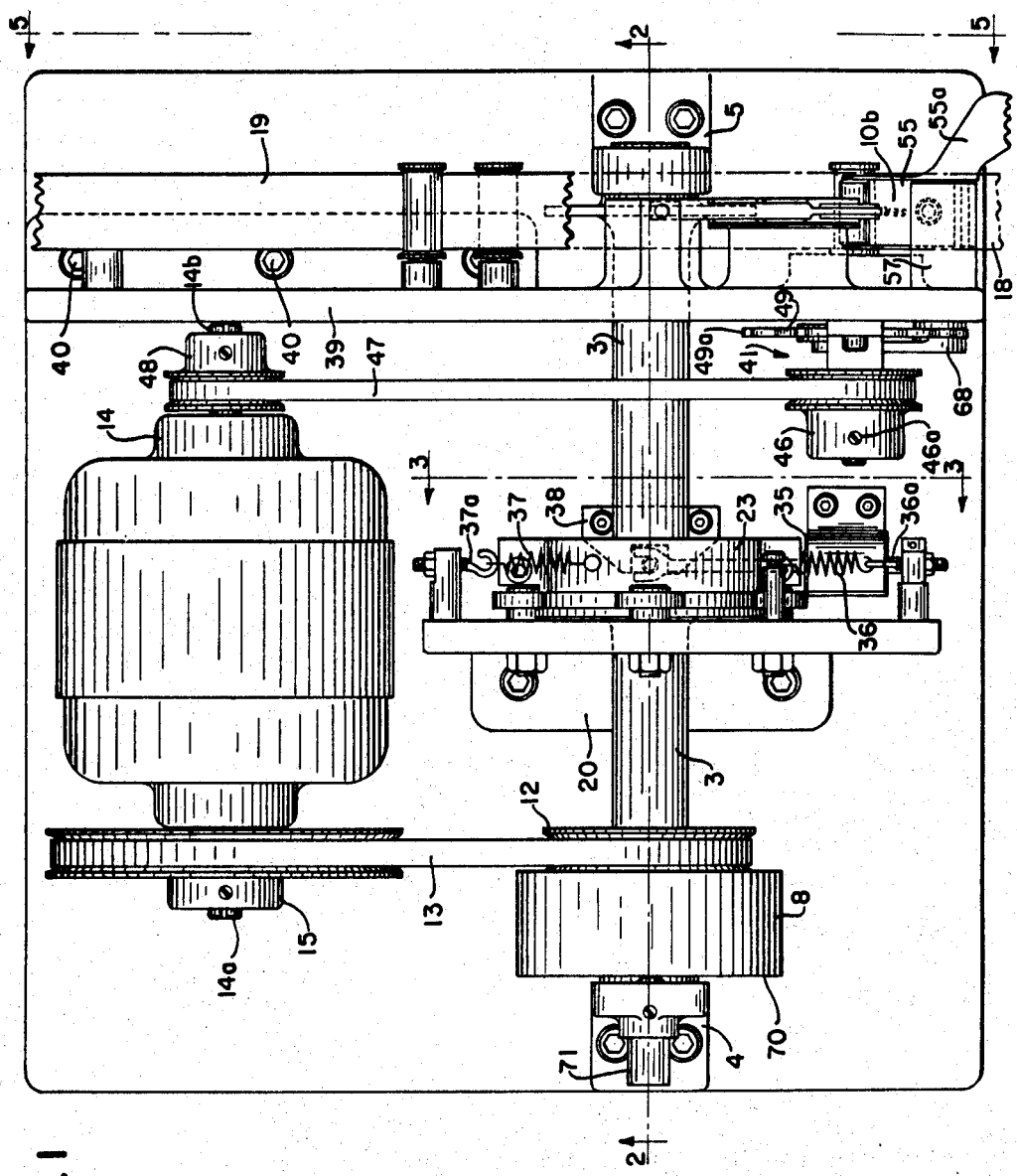
FIGURE 1 is a top plan view of a serial printer embodying the invention.

The combination of circular masses or rotating elements is constructed of three basic parts; namely, a shaft 3, which is journalled in the brackets 4 and 5 by means of respective bearings 6 and 7; a fly wheel 8, rigidly attached to the shaft 3 by means of the splines 9; and a type wheel 10, rigidly attached to the shaft 3 by means of splines 11. A pulley 12 is attached to the fly wheel 8, as shown in FIGURE 2, and operates by means of the belt 13, which is driven by the motor 14 and the pulley combination, as shown in FIGURE 1.

The section view of the type wheel 10 (FIGURE 2) shows that it is contoured for minimum inertia while retaining considerable rigidity and strength in the plane of the type wheel 10, which is perpendicular to the center line 2. The type wheel 10 has raised characters 10a, embossed as shown in FIGURE 2, which are suitable for printing on pressure-sensitive paper using the printing-on-the-fly principle. A print hammer actuating mechanism 16 (FIGURE 5) has a hammer portion 17, capable of striking pressure-sensitive paper 18, fed from a roll 19, against the type wheel 10 to cause a character 10b to be printed on the paper 18. The type of actuator used is not pertinent with regard to this serial printer embodiment of the invention, except that it must have a speed capability within the limits to be described presently.

As shown in FIGURE 2, the shaft 3 acts as a torsional spring between the fly wheel 8 (and the pulley 12) and the type wheel 10. A magnetic oscillator or excitation device 20 is provided for exciting torsional oscillation of the type wheel 10 with respect to the fly wheel 8. The excitation device 20 includes a rotor 21, secured to the shaft 3 by means of splines 22. The rotor 21 has two sets of external teeth 21a (FIGURE 4), each set having a number of teeth equal to the number of desired dwell positions of the type wheel 10. In this embodiment, the number of teeth 21a is equal to the number of characters 10a on the type wheel 10.

The rotor 21 is preferably made of a soft magnetic material and is constructed to operate in conjunction with a stator 23, having two sets of internal teeth 23a of the same number as the teeth 21a. The teeth 21a and 23a (both sets) align together in fifty-six angular positions of the rotor 21 only (FIGURES 3 and 4), with an air gap 24 between the teeth 21a and 23a just sufficient to provide running clearance between the rotor 21 and the stator 23.

The stator 23 also is constructed of magnetic material and is made in two parts, mating on the line 25—25 (FIGURE 3) and held together by bolts 26. The split stator 23 encloses a circular coil 27, which, when energized, creates flux paths 29 lying in planes which pass through the axis of the shaft 3 (FIGURES 2 and 4).

The stator 23 is mounted for frictionless rotation by means of ball bearings 30 operating in a circumferential groove 31 in the stator 23. The ball bearings 30 are mounted (FIGURE 2) on a bracket 32, which in turn is secured to the base 33. The rotary motion of the stator 23 operates the core 34 of a linear variable differential transformer 35 and is constrained to a center position by means of springs 36 and 37. An adjustable stop 38 is provided to control the total angular travel of the stator 23, while the spring tension adjustments of the hooks 36a and 37a (FIGURE 1) determine the static and dynamic angular position of the stator 23. When electric current is passing through the coil 27 and the drive motor 14 is not operating, the rotor 21 locks to the stator 23, so that the teeth 21a and 23a line up as shown in FIGURES 3 and 4.

The above-described locking action is quite powerful and in some cases may be sufficient to prevent the drive motor 14 from starting. If this condition should occur, the voltage to the coil 27 can be applied after the fly wheel 8 is partly up to speed, whereby the excitation power required by the magnetic oscillator 20 demands a much lower average running torque from the motor 14. The fly wheel 8 must have sufficient mass so that the oscillations of the type wheel 10 will have little or no effect on its steady rotation.

The print hammer actuating mechanism 16 and the paper roll 19 are mounted on a bracket 39, which in turn is mounted on the base 33 by means of bolts 40. Referring to FIGURES 2 and 3, it is seen that the brackets 4, 5, 32, and 39, the transformer 35, the stop 38, and the motor 14 are all mounted on the base 33.

The general arrangement of the serial printer embodiment of the invention is shown in FIGURE 1. The motor 14 has a double-ended shaft 14a–14b, providing a synchronized drive to both the shaft 3 and a paper-indexing mechanism. The paper-indexing mechanism 41 is similar to a Geneva mechanism and comprises a shaft 42 (FIGURE 6) journalled in a bearing 43 mounted in the bracket 44, which is secured to the bracket 39 by means of screws 45. A pulley 46 is secured to the shaft 42 by means of a set screw 46a and has teeth 46b which engage teeth 47a of a timing belt 47 (FIGURES 1 and 5). The belt 47 also engages a pulley 48, which completes the drive from the motor 14 to the shaft 42.

The shaft 42 has a shoulder 42a and an offset drive pin 42b. A single revolution of the shaft 42 causes the pin 42b to index the wheel 49 one position corresponding to one of the lobes 49a of the wheel 49. As shown in FIGURE 5, one revolution of the shaft 42 indexes the wheel 49 an angular position of one sixteenth of a revolution, since sixteen lobes 49a are provided on the wheel 49. The wheel 49 is secured to a shaft 50 by means of a set screw 51, which also indexes one sixteenth of a revolution per revolution of the shaft 42. The shaft 50 is journalled in ball bearings 52 and has a shaft 50a which has a tractive coating 50b for the purpose of driving the paper 18. The tractive surface coating 50b rotates against a roll 53 (FIGURE 5) journalled on a pin 54, which is mounted in a yoke 55. The yoke 55 has a finger 55a, useful for disengaging the roll 53 from the tractive surface coating 50b during the initial loading of the paper 18. The yoke 55 is pivoted on a pin 56 secured to a block 57, which is fastened to the bracket 39 by means of screws 57a (FIGURE 5). A spring 58 provides a force between the yoke 55 and the block 57, pressing the surface coating 50b of the shaft 50 together with the roll 53.

In FIGURE 5, the paper-indexing mechanism 41 is shown at the dwell position, with the pin 42b at the center of the dwell. In the dwell position, the wheel 49 is detented by a roll 59, journalled on a pin 60, which is secured to an arm 61. The arm 61 is pivoted on a pin 62 and is urged towards the roll 59 by the tension of a spring 63. The dwell time for the indexing mechanism 41 corresponds to slightly more than fifty percent of the time for one revolution of the shaft 42 (and the pin 42b). The arm 61 has an extension 64, which contacts one leaf of contact springs 65 during the paper advance cycle, thereby closing an electrical circuit (not shown) as the roll 59 rides over the high points of the lobes 49a of the indexing wheel 49. The contact springs 65 are mounted on an insulated block 68, as shown in FIGURE 5, and function as a switch assembly 69.

The indexing mechanism 41 corresponds to a conventional intermittent motion device and is not a part of the present invention. However, it serves to provide a ready comparison between the state-of-the-art intermittent motion devices and the present invention.

In the serial printer embodiment of the present invention shown in FIGURES 1 through 6, the timing belt pulleys 12, 15, 46, and 48 are provided with forty, seventy, twenty-four, and twenty-one teeth, respectively. Therefore, when the pulley 46 is rotated one complete revolution by the motor 14, the fly wheel 8 is rotated exactly two revolutions by the motor 14. The timing cycle of the basic elements of the serial printer will now be explained.

The face 70 (FIGURE 1) of the fly wheel 8 is a deposited nickel-cobalt film suitable for recording magnetic pulses by the magnetic read-write head 71. At the final assembly of the serial printer, fifty-six evenly-spaced pulses, represented by the lines 72 (FIGURE 16), are recorded on the surface 70 by the magnetic head 71 corresponding to the characters 10a on the type wheel 10. There is also recorded on the face 70 one extra pulse (line 73), located between two adjacent "character pulses." This extra pulse, bringing the total number of pulses recorded to fifty-seven, serves to trigger the electronic counter 300 (FIGURE 16) once for each revolution of the fly wheel 8.

The type wheel 10 is provided with fifty-six alphanumeric characters 10a (FIGURE 2). Printing is accomplished during one revolution of the fly wheel 8 and the type wheel 10, and paper advance and print hammer actuator restoration during the following revolution. The switch assembly 69 (FIGURE 5), in combination with the electrical control system shown in FIGURE 16, serves to initially phase the "ability to print" period of the hammer-actuating mechanism 16 with the revolution of the type wheel 10 during which the index wheel 49 and the paper 18 remain stationary.

*Glossary*

$d$=outside diameter of torsion shaft=$2r$
$d_1$=inside diameter of torsion shaft
$l$=active length of single torsion shaft
$I$=subscript indicating quantity "idealized" for lowest possible shaft stress
$I_p$=polar moment of inertia
$I_w$=inertia of wheel, lb.-in.-sec.$^2$
$I_s$=inertia of shaft, lb.-in.-sec.$^2$
$I_\mu$=shaft inertia per unit length, lb.-in.-sec.$^2$
$c$=shaft diameter ratio=$d_1/d$
$n$=fly wheel speed, r.p.s.
$T$=number of rotor excitation teeth
$D$=number of effective dwell midpoints per revolution of fly wheel when its speed is $n$ r.p.s.
$t$=time, seconds
$C$, $C_1$, and $C_2$=arbitrary constants in shaft deflection equations
$S$=shear stress at outermost fiber of torsion bar
$S_{(x)}$=shear stress at outermost fiber of torsion bar at a section $x$ distance from fly wheel
$S_{(o)}$=max. shear stress, at $x=0$
$g$=acceleration of gravity=386.088 in./sec.$^2$
$G$=modulus of rigidity, or torsion, lbs./sq. in.=$11.5 \times 10^6$ for steel, approximately
$\gamma$=density, lbs. per cu. in.=.2833 for steel
$\alpha$=arbitrary parameter in transcendental frequency equation $$= l\sqrt{\frac{I_u\omega^2}{GI_p}}$$

$f_r$=resonant frequency, cycles per second
$f_n$=natural frequency, cycles per second
$f_t$=forcing frequency=$nT$, cycles per second
$\phi_x$=maximum angle of shaft twist at a section $x$ distance from fly wheel
$\phi_1$=maximum angle of shaft twist at a section $l$ distance from fly wheel
$\tau$=angle of fly wheel displacement=$2\pi nt$
$\theta$=angular displacement of point F with respect to OX
$\omega$=instantaneous angular velocity of point F.

In the serial printer embodiment of the present invention, the shaft 3 acts as a torsional spring between the fly wheel 8 and the type wheel 10. If it is supposed that the fly wheel 8 is rigidly clamped and then the type wheel 10 is rotated through an angle $\phi$ and instantly released, the type wheel 10 will vibrate at some resonant frequency, $f_r$, relative to the fly wheel 8. If the shaft 3 is made of a high-quality, heat-treated steel, for example, the internal damping of the shaft material will be extremely low, and the resonant frequency $f_r$ equals the natural frequency $f_n$ of the shaft 3-type wheel 10 system. The shaft 3-type wheel 10 system frequency from this point on will be referred to as frequency $f_n$, which should be taken as the natural frequency of the system, until such a point in the description when the small internal damping of the shaft 3 is included in order to determine the energy input into the torsionally oscillating rotating system and to describe the servo control system.

FIGURES 7 and 8, which are views looking into the fly wheel 8 of FIGURE 2, are useful for explaining the effects of various parameters on the effective dwells of the intermittent motion device of the present invention. They are schematic only and show the fly wheel 8 for clarity of illustration only. In FIGURES 7 and 8, point P is located on the fly wheel 8, which rotates with a steady rotation, and point F is located on the oscillating type wheel 10, representing a point on a type face.

The point P is located along the circumference of the fly wheel 8 in such a position that both of the points P and F lie in a plane (which also includes the axis 0 of the wheels 8 and 10 and the torsion shaft 3) when there is no stress in the torsion shaft 3. Therefore, the torsional harmonic oscillation of the point F relative to the fly wheel 8 always remains symmetrical to the point P, and it can be arbitrarily said that at $t=0$, $\tau=\phi_1 \sin 2\pi f_n t=\theta=0$, and both positive vectors OP and OF lie on the OX axis of reference (FIGURE 8).

Now, if the fly wheel 8 is driven, by some means such as the motor 14, at a speed of $n$ revolutions per second and it is assumed that the type wheel 10 is oscillating with a constant maximum amplitude $\phi_1$ and frequency $f_n$ relative to the fly wheel 8, then (1) $\qquad \tau=2\pi nt$ due to the steady rotation, and the quantity $\phi_1 \sin 2\pi f_n t$ is the angular displacement of point F relative to point P on the fly wheel 8 (FIGURE 7). Therefore, the angular position $\theta$ of point F with respect to OX, which is a stationary reference line relative to a base point, such as the print hammer 17, is (2) $\qquad \theta=2\pi nt-\phi_1 \sin 2\pi f_n t$ The instantaneous angular velocity $\omega$ at any time $t$ of the point F relative to OX is found by differentiating Equation 2; that is, $$(3) \qquad \omega = \frac{d\theta}{dt} = 2\pi n - 2\pi f_n \phi_1 \cos 2\pi f_n t$$

Equation 3 defines the characteristics of each effective dwell for each cycle of oscillation of the type wheel 10 at the frequency $f_n$, the amplitude $\phi$, and the fly wheel 8 speed of $n$ revolutions per second.

The effective dwells are caused by the fact that the oscillations of the type wheel 10 are superimposed on the steady rotation of the fly wheel 8, and for a particular half of each cycle of oscillation of the type wheel 10 its angular rotation opposes that of the fly wheel 8. The greatest angular velocity of the type wheel 10 with respect to the fly wheel 8 occurs at the instant of zero stress in the shaft 3, or when the instantaneous angle of shaft twist $\phi_{11}$ is zero (shaft of length $l$ inches). This occurs twice each cycle: once adding to and once subtracting from the forward rotation of the fly wheel 8. The maximum angle of twist $\phi_1$ determines the maximum angular velocity which occurs when the instantaneous angle of twist is zero.

The phrase "effective dwell" has been chosen to represent any or all of the three possible dwell conditions per cycle of period $1/f_n$:

1. No instantaneous dwells per cycle.
2. One instantaneous dwell per cycle.
3. Two instantaneous dwells per cycle.

As will be shown presently, an effective dwell falling in any one of the three above categories can be useful for certain applications.

Category 1 above covers the situation where the oscillating member slows down once per cycle with reference to a stationary point but does not come to a complete stop. Midpoints of all effective dwells are found by differentiating Equation 3; that is, $$(4) \qquad \frac{d\omega}{dt} = 4\pi^2 f_n^2 \phi_1 \sin 2\pi f_n t$$

To find the maximum and minimum points, this derivative is set to zero; that is, $$(5) \qquad \sin 2\pi f_n t = 0, \text{ or}$$

$$(6) \qquad f_n t = 0, \tfrac{1}{2}, 1, \tfrac{3}{2}, 2 \text{ etc.}$$

In FIGURES 7 and 8, at $t=0$, there occurs the midpoint of an effective dwell. Therefore, the effective dwell midpoints occur at $$(7) \qquad f_n t = 0, 1, 2, 3, \text{ etc., or at}$$

$$(8) \qquad t = 0, \frac{1}{f_n}, \frac{2}{f_n}, \frac{3}{f_n}, \text{ etc.}$$

Similarly, the maximum surface velocities of the oscillating wheel 10 relative to ground occur at $$(9) \qquad t = \frac{1}{2f_n}, \frac{3}{2f_n}, \frac{5}{2f_n}, \text{ etc.}$$

Equations 8 and 9 show that a device which indicates the surface velocity of the oscillating wheel 10 will monitor the frequency of oscillation $f_n$ regardless of the speed of the fly wheel 8.

Let $D$ = the number or effective dwell midpoints per revolution when the fly wheel 8 speed is constant at $n$ revolutions per second.

Therefore, since one effective dwell occurs once each cycle of oscillation (of period $1/f_n$), $$(10) \qquad D = \frac{f_n}{n}$$

Equation 10 is the general expression for the number of effective dwells per revolution of the fly wheel 8. For some applications, such as the serial printer embodiment of the invention, it is essential that D be an integer value and that the fly wheel 8 speed $n$ remain essentially constant, so that the effective dwell midpoints do not drift with time.

One of the unique features of the present invention is that, by constructing the rotor 21 of the excitation device 20 with a number of teeth 21a equal to the number of effective dwells desired per revolution of the fly wheel 8 (in this case equal to the number of characters 10a on the type wheel 10), all that is necessary for correct operation is to drive the fly wheel 8 at a speed which will sustain the oscillations of the type wheel 10 relative to the fly wheel 8 at maximum amplitude. The excitation frequency, commonly referred to as a forcing frequency ($f_f$), is $$(11) \qquad f_f = nT$$

where T is equal to the number of rotor teeth 21a. For maximum amplitude of oscillation, $f_f$ will substantially equal $f_n$; therefore, the correct drive speed to excite the system at its natural frequency is $$(12) \qquad n = f_n / T$$

An important consideration is the case where there occurs one or two instantaneous dwells per cycle. An instantaneous dwell occurs when $\omega = 0$ in Equation 2, giving $$(13) \qquad n - f_n \phi_1 \cos 2\pi f_n t = 0$$

Solving Equation 13 for $t$ gives:

$$(14) \qquad t = \frac{1}{2\pi f_n} \cos^{-1}\left(\frac{n}{f_n \phi_1}\right)$$

Substituting Equation 14 in Equation 2 gives, by trigonometric manipulation and simplification:

$$(15) \qquad \theta = \frac{n}{f_n} \cos^{-1}\left(\frac{n}{f_n \phi_1}\right) - \phi_1 \sqrt{1 - \left(\frac{n}{f_n \phi_1}\right)^2}$$

Equation 15 gives the location of instantaneous dwells relative to the reference line OX for the general case; that is, either one or two instantaneous dwells per cycle and any number of dwells per revolution of the fly wheel 8, not necessarily an integer number.

Dwells falling under the category of a single instantaneous dwell per cycle will occur at the effective dwell midpoints, and Equation 7 can be substituted in Equation 13, which gives $$(16) \qquad n - f_n \phi_1 = 0$$

$$(17) \qquad \phi_1 = \frac{n}{f_n}$$

Substituting Equation 17 in Equation 15, after simplifying, gives:

$$(18) \qquad \theta = \frac{n}{f_n} \cos(1.000) = \frac{n}{f_n}(0, 2\pi, 4\pi, \text{ etc.})$$

Equation 18 gives the location of effective dwell midpoints relative to the reference line OX $$\left(\text{when } \phi_1 = \frac{n}{f_n}\right)$$

for the general case of any number (fractional or integer) of dwells per revolution of the fly wheel 8. For one instantaneous dwell per cycle, Equation 12 is substituted in Equation 17, which gives:

$$(19) \qquad \phi_1 = \frac{1}{T} \text{ (radians)}$$

Equations 12 and 19 can be substituted in Equation 2, giving the angular displacement equation when the rotor teeth 21a and the natural frequency only are known, for one single instantaneous dwell per cycle:

$$(20) \qquad \theta = \frac{2\pi f_n t - \sin 2\pi f_n t}{T}$$

Similarly, for the general case of one effective dwell per cycle:

$$(21) \quad \theta = \frac{2\pi f_n t}{T} - \phi_1 \sin 2\pi f_n t$$

Equations 20 and 21 assume that the fly wheel 8 is being driven at the correct speed to excite the torsional vibrating system at its resonant frequency.

FIGURE 9 shows circumferential displacement plots of a type face based on Equation 21 for five values of $\phi_1$. The single instantaneous dwell per cycle is the plot where $\phi_1 = 1/T = 1/64 = 0.015625$ radians. The values for $T$ and $r$ do not apply to the serial printer embodiment (FIGURES 1 to 6) of the present invention but rather apply to the drum printer embodiment (FIGURES 28 and 29).

It should be noted that in FIGURE 9, for values of $\phi_1$ greater than $1/T$ (0.015625 radians) two instantaneous dwells occur per cycle and that there is a small plus and minus displacement of the type face during this effective dwell period. The magnitude of the plus and minus displacement increases with an increase in the magnitude of twist angle $\phi_1$, and, since the latter is readily controlled by varying the voltage to the coil 27 (FIGURE 2) of the magnetic oscillator 20, a simple means is available for changing the effective dwell characteristics. These controlled displacements about the zero point ($f_n t = 0, 1, 2$, etc.) are extremely useful in printing, since a slight shear action is present between the hammer 17 and the type character 10a (FIGURE 2). This is of particular advantage in printing when, instead of pressure-sensitive paper 18, ribbon or carbon paper is used between the print hammer 17 and a regular untreated paper, since a slight shear action greatly aids in the transfer of ink to the paper. This slight shear action is not to be confused with the smear action obtained in printing on a constantly-rotating print wheel which does not have the effective dwell capability.

An investigation of Equation 18 will make it apparent that, if the speed $n$ of the fly wheel 8 is not properly chosen with respect to $f_n$, the effective dwell midpoint locations for any particular point F (FIGURES 7, 8, and 17) of the type wheel 10 will not remain stationary for more than one revolution of the fly wheel 8, assuming that a change of $n$ and $f_f$ does not change the maximum amplitude of oscillation $\phi_1$. Instead, the effective dwell midpoint locations will drift either clockwise or counter-clockwise, depending on the magnitudes of $n$ and $f_n$. The foregoing can be illustrated in a more convenient manner as follows:

Imagine that a rotary "observation table" is provided which has a reference line OX' which coincides with OX at $t=0$, and has a center of rotation at 0. If the rotary speed of this observation table has some definite speed, either $\pm n'$, the speed $n'$ can be so chosen that an integer number of instantaneous dwells relative to the observation table can be observed.

Therefore, if an integer number of dwells relative to the observation table is desired:

$$(22) \quad D \text{ (integer)} = f_n (n \pm n')$$

where $n'$ is the angular drive velocity (r.p.s.) of the effective dwell midpoints; that is, effective dwell midpoint per cycle of oscillation.

An uncontrolled random drive condition in an intermittent motion device is intolerable, and a method must be used to keep the dwells referenced to the base line OX. Four possible systems can be listed to accomplish this purpose, as follows:

(1) Separate excitation control and separate speed control. This system is believed to be the least desirable of the four systems and is not illustrated in the drawings. Such a system can be described simply by referring to FIGURE 2 of the serial printer embodiment. First, consider that the excitation device 20 is removed, including the bracket 32, and a different member is substituted for the rotor 21. A new member is also substituted for the stator 23 and is constructed integral with the pulley 12 on the fly wheel 8, which serves to operate magnetically with the new rotor in a manner to set the type wheel 10 in oscillation relative to the fly wheel 8. Second, consider that the fly wheel 8 is driven at a carefully-controlled speed, $n$ revolutions per second, so that Equation 22 is satisfied when $n'$ is zero for the required integer number of dwells D. As shown by Equation 22, either a change in the natural frequency $f_n$ of the shaft 3 system or a change in the fly wheel 8 speed can cause a drift in the dwell locations. A tight control of the fly wheel 8 by a servo system would be necessary to prevent drifting of dwell locations. This fact, in addition to the utilization of slip-rings and a more complicated excitation mechanism, makes the other systems, which follow, more desirable for most applications. However, for applications where it is desirable that the effective dwells do drift, or where the number of dwells D per revolution is not an integer number but is equal to $f_n/n$, the system as just described is one which under certain circumstances may be desirable.

(2) The second system is utilized in the motion picture projector embodiment of the present invention (FIGURES 23 to 27) to be described later. It is composed primarily of a synchronous drive to the member which is driven for steady rotation, and an excitation device with a fixed stator element. It is the simplest of the four systems and is particularly adaptable to the lower frequencies, since at the lower frequencies the fixed stator provides a forcing frequency which can overpower the natural frequency $f_n$, if the two frequencies vary by only a very small amount. The fixed stator element prevents the dwell locations from "drifting" and simplifies the overall design. As frequencies increase, a much closer and more precise speed control is necessary, since the speed range over which it is possible to overdrive or overpower the shaft-wheel system's natural frequency begins to narrow sharply. With this system, the instantaneous dwells can be made to "drift" in a controlled manner by arranging the stator to be driven either clockwise or counter-clockwise, keeping the relative speed between the steady rotation and the stator member constant. The third and fourth systems are adaptable to high-frequency intermittent motion devices.

(3) The prior description of the serial printer embodiment (FIGURES 1 to 6) of the present invention covers the third system, which utilizes and features speed control of the fly wheel 8 based on rotary reaction forces on the stator 23 of the excitation device 20.

(4) A fourth system, to be described later in relation to the drum printer embodiment (FIGURES 28 and 29) of the present invention, is shown as an oscillating type drum with two "magnetic oscillators" with fixedly adjustable stators, and with a vibration transducer (or an optical sensing device) for controlling the forward speed of rotation of the system.

The average forward speed of the rotating system 1 (FIGURE 2) of the serial printer embodiment of the present invention has been arbitrarily fixed at fifty revolutions per second (3,000 r.p.m.) by the design of the type wheel 10, the excitation rotor 21, and the torsion shaft or bar 3. This design begins with the calculation of the inertia of the type wheel 10 and its accompanying bearing support. The total inertia $I_w$ has been computed to be $296.071 \times 10^{-6}$ lb.-in.-sec.$^2$ for one specifically dimensional type wheel. This total inertia $I_w$ includes the inertia of bearings (such as the bearing 6, FIGURE 2), which must be considered to be moving at less than half the instantaneous speed of rotation of the type wheel 10, an inner bearing race and a resilient member (not shown). This last-mentioned resilient member has a density which is less than the value of 0.2833 pound per square inch used for steel and is needed to apply a uniform longitudinal force to the inner bearing race in order to maintain contact of the bearings 7 with the inner and outer bearing races. The reason for this is that, in addition to the rotary oscillation of the type wheel 10, there is also a longitudinal vibration of the type wheel 10 (parallel to the center line 2, FIGURE 2) with respect to the flywheel 8. This longitudinal vibration produces sound of a definite frequency and is caused by the shortening of the shaft 3 as it winds up to the maximum angle of twist $\phi_1$. (S. Timoshenko, Strength of Materials, pt. II, Advanced Theory and Problems, third ed., 1956, pp. 286 to 289, D. Van Nostrand Company, Incorporated, Princeton, N.J., United States of America.)

Since fifty-six rotor teeth 21a are provided (FIGURES 2 and 4), the frequency $f_n$ is $56 \times 50 = 2,800$ cycles per second in accordance with Equation 12. The inertia of the type wheel 10 and the frequency $f_n$ fix the physical dimensions of the torsion shaft 3. Equations are hereinafter derived which are useful in the design of any intermittent motion device based on the principles of the present invention.

FIGURE 10 shows three related views of a one-mass system for the exact calculation of a torsion bar with an end or a center mass. The calculations of FIGURES 10 and 11 which follow are based on the presentation given in the book "Mechanical Vibrations," by Den Hartog, fourth ed., 1956, McGraw-Hill Book Company, Incorporated, pp. 138 and 145 to 147. In order to handle the problem of FIGURE 10, it is first necessary to obtain a differential equation of the torsional vibration in a bar without the center mass of inertia $I_w$.

FIGURE 11 illustrates a uniform torsion bar with built-in ends. Let the deflection curve during the vibration be $\phi(x, t)$, where the angle of twist varies both with the location along the bar and with the time.

At section a—a (FIGURE 11), considering the torsion bar at a certain instant of time, the torque due to the bar to the left of a—a is:

$$-GI_p \frac{\partial \phi}{\partial x}$$

where $G$ = modulus of rigidity, and $I_p$ = polar moment of inertia of shaft, which can be considered negative, since it is in a clockwise direction.

At the right of the element $dx$, section b—b, the counter-clockwise component of the torque is $$+GI_p \frac{\partial \phi}{\partial x} + \partial \left( GI_p \frac{\partial \phi}{\partial x} \right) =$$

$$+GI_p \frac{\partial \phi}{\partial x} + \frac{\partial}{\partial x} \left( GI_p \frac{\partial \phi}{\partial x} \right) dx =$$

$$+GI_p \frac{\partial \phi}{\partial x} + GI_p \frac{\partial^2 \phi}{\partial x^2} dx$$

Therefore, the two torques at sections a—a and b—b are not equal, the torque at the latter section, being greater, tending to accelerate the element $dx$ in a (positive) counter-clockwise direction. The factor $$\frac{\partial^2 \phi}{\partial x^2} dx$$

denotes the increase in slope along $dx$.

If the inertia of the torsion bar per unit length is denoted by $I_\mu$, then the inertia of $dx$ is $I_\mu dx$, and Newton's law gives $$I_\mu dx \frac{\partial^2 \phi}{\partial t^2} = GI_p \frac{\partial^2 \phi}{\partial x^2} dx$$

Dividing through by $dx$ gives the partial differential equation of the uniform torsion bar with built-in ends:

(23) $$I_\mu \frac{\partial^2 \phi}{\partial t^2} = GI_p \frac{\partial^2 \phi}{\partial x^2}$$

The bar of FIGURE 11 is a torsional vibrating system of many degrees of freedom, since each element $dx$ (of polar moment of inertia $I_p$) along the length of the shaft can have its own respective angular displacement at any instant of time $t$. Likewise, FIGURE 10 illustrates a system of many degrees of freedom, since the inertia and the angular deflection of shaft elements are not neglected, as is the case for a torsional pendulum acting as a single-degree-of-freedom system.

To obtain a solution of Equation 23, it can be assumed that the torsion bar vibrates harmonically at some natural frequency and in some natural or normal configuration. In mathematical language, this means that is can be assumed

(24) $$\phi(x,t) = \phi(x) \sin \omega t$$

Substituting Equation 24 in Equation 23 gives

(25) $$\frac{d^2 \phi}{dx^2} + \frac{I_\mu \omega^2}{GI_p} \phi = 0$$

which is an ordinary differential equation. On page 138 of the book entitled "Mechanical Vibrations," previously referred to, it is stated:

"Whereas in all previous problems this sort of assumption simplified the ordinary differential equations to algebraic ones, we have here the simplification of a partial differential equation to an ordinary differential equation."

The differential equation of motion of a single-degree-of-freedom system in torsion (FIGURE 12) is:

(26) $$I\ddot{\phi} + C'\dot{\phi} + k\phi = L_o \sin \omega t$$

The four terms in Equation 26 are the inertia torque, the damping torque, the spring torque, and the external torque.

If it be assumed that damping is zero and there is no external torque, Equation 26 becomes

(27) $$I\ddot{\phi} + k\phi = 0$$

It is seen that Equation 25 has the same mathematical form as Equation 27, or, in other words, the amplitude of a single-degree-of-freedom system as a function of time.

Therefore, the general solution of Equation 25 is like that of the solution of Equation 27, which is

(28) $$\phi = C_1 \sin t \sqrt{\frac{k}{I}} + C_2 \cos t \sqrt{\frac{k}{I}}$$

Similarly, the solution of Equation 25 is

(29) $$\phi_x = C_1 \sin x \sqrt{\frac{I_\mu \omega^2}{GI_p}} + C_2 \cos x \sqrt{\frac{I_\mu \omega^2}{GI_p}}$$

which determines the shape of the torsion shaft at the instant of maximum deflection.

$\phi = 0$, for $X = 0$, and for $X = 2l$

Substituting $x = 0$ gives $C_2 = 0$.
Substituting $x = 2l$ gives

(30) $$\phi_1 = 0 = C_1 \sin 2l \sqrt{\frac{I_\mu \omega^2}{GI_p}}$$

This can be satisfied by making $C_1 = 0$, which gives the correct solution of the torsion bar remaining at rest. However, Equation 30 can also be satisfied by making the argument of the sine an integer multiple of $\pi$, or 180 degrees.

Therefore,

(31) $$2l \sqrt{\frac{I_\mu \omega^2}{GI_p}} = 0, \pi, 2\pi, 3\pi, \text{etc.}$$

Equation 31 determines the natural frequencies while the corresponding nomal modes can be found at once by the substitution of Equation 31 in Equation 29.

A specific interest is in the fundamental frequency only, so (31a) $$\sqrt{\frac{I_\mu \omega^2}{GI_p}} = \frac{\pi}{2l}$$

and substituting in Equation 29 gives

(32) $$\phi = C_1 \sin \frac{\pi x}{2l}$$

Maximum deflection $\phi_1$ will occur at $x=l$, and, since this would be a known parameter:

(33) $$\phi = \phi_1 \sin \frac{\pi x}{2l}$$

Solving Equation 31a for $\omega$ gives $$\omega = \frac{\pi}{2l}\sqrt{\frac{GI_p}{I_\mu}}$$

But $I_\mu$=shaft inertia per unit length $$= I_p \times \frac{\gamma}{g}$$

where $\gamma$=density of material in bar, pounds per cubic inch, $g$=acceleration of gravity, inches per sec.$^2$.
Therefore,

(34) $$\omega = \frac{\pi}{2l}\sqrt{\frac{gG}{\gamma}}$$

=radian frequency (radians per sec.)

and since $\omega = 2\pi f$

(35) $$f = \frac{1}{4l}\sqrt{\frac{gG}{\gamma}}$$

cycles per second.

It should be noted from Equation 35 that the length of a uniform bar (with end or ends built in) and its material are the only two parameters which determine the frequency of vibration.

If the frequency is known, Equation 35 determines the length of the shaft required. Therefore, for a shaft with one or two built-in ends,

(36) $$l = \frac{1}{4f}\sqrt{\frac{gG}{\gamma}}$$

For steel, the following values can be substituted in Equation 36:

$g = 386.088$ in./sec.$^2$, gravity standard,
$G = 11.5 \times 10^6$ lb./in.$^2$, modulus of rigidity—varies for different steels,
$\gamma = 0.2833$ lb./in.$^3$, varies slightly for different steels.

(37) $$l_{(steel)} = \frac{31,297}{f}$$

For a uniform shaft with each end built in, where total shaft length=$2l$,

(38) $$2l_{(steel)} = \frac{62,594}{f}$$

Using Equation 33 and referring to FIGURE 11, $$\tan \beta = \frac{d}{dx}\left[\frac{d}{2}\phi_x\right] = \frac{d}{2} \times \frac{d}{dx}\left[\phi_1 \sin \frac{\pi x}{2l}\right] = \frac{d\pi\phi_1}{4l}\cos\frac{\pi x}{2l}$$

For the small angles concerned (deflection curves shown in FIGURES 10 and 11 are greatly exaggerated), $\beta = \tan \beta$ = angle of shear, radians Since stress=$S=G\beta$,

(39) $$S = \frac{\pi d G \phi_1}{4l}\cos\frac{\pi x}{2l}$$

Maximum stress occurs at $x=0$, or $x=2l$.
Therefore,

(40) $$S_{(\omega)}(I_w = 0) = \frac{\pi d G \phi_1}{4l}$$

The case where the torsion bar has a center mass of moment of inertia $I_w$, as shown in FIGURE 10, is next considered. Equation 29 gives the general shape of a bar vibrating torsionally, which can be applied to the left half of the bar, of length $l$. The condition that the left end is at rest gives $C_2 = 0$, as before, and

(41) $$\phi = C \sin x\sqrt{\frac{I_\mu \omega^2}{GI_p}}$$

where C and $\omega$ are unknown. The amplitude C is needed for the deflection Equation 41, and the frequency $\omega$ determines the "wave length" of the sine curve. In FIGURE 10 the shape of the bar is shown, with the right half of the deflection curve as a mirror image of the left half. The central mass experiences an inertia torque $I_w \omega^2 \phi_1$, and, if it is considered that the mass is supported by the left torsion bar only, then the mass also experiences an elastic torque $$I_p \times \frac{2}{d} \times G_x \beta_1$$

Since these two forces must be in equilibrium,

(42) $$\frac{2I_p G \beta_1}{d} = I_w \omega^2 \phi_1$$

Using Equation 41:

(43) $\beta$=Shear angle=$\tan \beta = \frac{d}{dx}\left(\frac{d}{2}\phi\right)$ $$= \frac{d}{2}C\sqrt{\frac{I_\mu \omega^2}{GI_p}}\cos x\sqrt{\frac{I_\mu \omega^2}{GI_p}}$$

(44) Therefore, $\beta_1 = \frac{d}{2}C\sqrt{\frac{I_\mu \omega^2}{GI_p}}\cos l\sqrt{\frac{I_\mu \omega^2}{GI_p}}$ Also from Equation 41,

(45) $$\phi_1 = C \sin l\sqrt{\frac{I_\mu \omega^2}{GI_p}}$$

Substituting Equations 44 and 45 in Equation 42, $$\frac{2I_p G}{d} \times \frac{d}{2} \times C\sqrt{\frac{I_\mu \omega^2}{GI_p}}\cos l\sqrt{\frac{I_\mu \omega^2}{GI_p}} = I_w \omega^2 C \sin l\sqrt{\frac{I_\mu \omega^2}{GI_p}}$$

This reduces to:

(46) $$l\sqrt{\frac{I_\mu \omega^2}{GI_p}}\tan l\sqrt{\frac{I_\mu \omega^2}{GI_p}} = \frac{I_\mu l}{I_w} \quad \text{Letting } \alpha = l\sqrt{\frac{I_\mu \omega^2}{GI_p}}$$

Also, $I_s$=shaft inertia=$I_\mu l$,

Therefore, substituting Equation 47 in Equation 46 gives the transcendental frequency equation:

(48) $$\alpha \tan \alpha = \frac{I_\mu l}{I_w} = \frac{I_s}{I_w}$$

Now, assuming that Equation 48 is satisfied for a given $I_s$ and $I_w$, $\phi_1$ can be obtained from Equation 41 and the value obtained for $\alpha$ from Equation 48 inserted as follows:

(49) $$\phi_1 = C \sin l\sqrt{\frac{I_\mu \omega^2}{GI_p}} = C \sin \alpha$$

(50) Therefore, $C = \frac{\phi_1}{\sin \alpha}$

Substituting Equation 50 in Equation 43 gives:

(51) $$\beta = \frac{d}{2}\phi_1\sqrt{\frac{I_\mu \omega^2}{GI_p}}\frac{\cos x\sqrt{\frac{I_\mu \omega^2}{GI_p}}}{\sin l\sqrt{\frac{I_\mu \omega^2}{GI_p}}}$$

Since stress=$X = G\beta$,

(52) $$S = \frac{d\phi_1 G}{2}\sqrt{\frac{I_\mu \omega^2}{GI_p}}\frac{\cos x\sqrt{\frac{I_\mu \omega^2}{GI_p}}}{\sin l\sqrt{\frac{I_\mu \omega^2}{GI_p}}} = \frac{d\phi_1 G}{2l}\alpha\frac{\cos x\sqrt{\frac{I_\mu \omega^2}{GI_p}}}{\sin \alpha}$$

Equation 52 is the basic stress equation, which gives the stress in the outermost fiber of the torsion bar at any distance X from the left end of the shaft, and, by inspection, the maximum stress will occur when $X=0$. Therefore, for maximum stress:

(53) $$S_{(o)} = \frac{d\phi_1 G}{2l} \alpha \csc \alpha$$

Since $\alpha \tan \alpha = I_s/I_w$, it is convenient to obtain an expression of $\alpha \csc \alpha$ in terms of $I_s$ and $I_w$. Referring to the right triangle of FIGURE 13, let $\tan \alpha = a/b$, and $I_s/I_w = k = \alpha \tan \alpha$. From FIGURE 12, $$\csc \alpha = \frac{\sqrt{a^2+b^2}}{a}$$

and $\alpha \tan \alpha = a/b = k$;
and $a = bk/\alpha$. Therefore, $$\csc \alpha = \frac{\sqrt{\frac{b^2k^2}{\alpha^2}+b^2}}{\frac{bk}{\alpha}} = \sqrt{\left(\frac{\alpha}{k}\right)^2+1}$$

Substituting $k = I_s/I_w$ gives

(54) $$\alpha \csc \alpha = \alpha \sqrt{\left(\frac{\alpha I_w}{I_s}\right)^2+1}$$

and Equation 53 becomes

(55) $$S_{(o)} = \frac{d\phi_1 G}{2l} \alpha \sqrt{\left(\frac{\alpha I_w}{I_s}\right)^2+1}$$

It should be noted that the above manipulation converted the transcendental Equation 53 into an algebraic equation. Since $$I_w = I_p \cdot \frac{\gamma}{g}$$

substitution can be made in Equation 47. Therefore,

(56) $$\alpha = l\omega \sqrt{\frac{\gamma}{gG}}$$

Also, since $$I_s = lI\mu = lI_p \frac{\gamma}{g}$$

appropriate substitutions can be made in Equation 55:

(57) $$S_{(o)} = \frac{d\phi_1 \omega}{2} \sqrt{\frac{I_w^2 \omega^2}{I_p^2} + \frac{\gamma G}{g}}$$

Equation 57 can be checked by letting $I_w=0$; this should check Equation 40 regarding the uniform torsion bar of FIGURE 11. Therefore, letting $I_w=0$, Equation 57 gives:

(57a) $$S_{(o)\,(I_w=0)} = \frac{d\phi_1 \omega}{2} \sqrt{\frac{\gamma G}{g}}$$

Equation 40 is:

$$S_{(o)\,(I_w=0)} = \frac{\pi d G \phi_1}{4l}$$

But Equation 36 is

(36) $$l = \frac{1}{4f}\sqrt{\frac{gG}{\gamma}}$$

and when substituted in Equation 40 gives $$S_{(o)\,(I_w=0)} = \frac{d\phi_1 \times 2\pi f}{2}\sqrt{\frac{\gamma G}{g}}$$

or since $\omega = 2\pi f$, (40a) $$S_{(o)\,(I_w=0)} = \frac{d\phi_1 \omega}{2}\sqrt{\frac{\gamma G}{g}}$$

identical to Equation 57a.
The polar moment of inertia of a hollow shaft is

(58) $$I_p = \frac{\pi(d^4-d_1^4)}{32}$$

It will be convenient to let $d_1=cd=$inside diameter of shaft in inches. Therefore,

(60) $$I_p = \frac{\pi d^4(1-C^4)}{32}$$

Substituting Equation 60 in Equation 57 gives

(61) $$S_{(o)} = \frac{d\phi_1 \omega}{2}\sqrt{\frac{1024 I_w^2 \omega^2}{\pi^2 d^8(1-C^4)^2} + \frac{\gamma G}{g}}$$

Arranging Equation 61 for differentiating:

$$S_{(o)} = \left(\frac{256 I_w^2 \omega^2 \phi_1^2}{\pi^2 d^6(1-C^4)^2} + \frac{d^2 \phi_1^2 \omega^2 \gamma G}{4g}\right)^{1/2}$$

Letting:

$$A = \frac{256 I_w^2 \omega^4 \phi_1^2}{\pi^2(1-C^4)^2}, \text{ and } B = \frac{\phi_1^2 \omega^2 \gamma G}{4g}$$

(62) Therefore, $S_{(o)} = (Ad^{-6} + Bd^2)^{1/2}$

Differentiating with respect to the outside diameter $d$ to find minimum:

$$\frac{dS_{(o)}}{dd} = \frac{1}{2}(Ad^{-6}+Bd^2)^{-1/2}(-6Ad^{-7}+aBd) = 0$$

$$I_F, (Ad^{-6}+Bd^2)^{-1/2} = 0$$

$$d = \sqrt[8]{-\frac{A}{B}} \text{ (no solution)}$$

$$I_F, -6Ad^{-7}+2Bd = 0$$

$$d = \sqrt[8]{\frac{3A}{B}}$$

This must be a minimum, since it is obvious by inspection of Equation 62 that there is no maximum, since as $d \to \infty$, $S_{(o)} \to \infty$.

Therefore, for minimum stress in a torsional bar design, the "idealized" (I) diameter $d_I$ is:

(63) $$d_I = 2.0494 \sqrt[4]{\frac{I_w \omega}{1-C^4}} \sqrt[8]{\frac{g}{\gamma G}}$$

or since $\omega = 2\pi f$ (63a) $$d_I = 3.2448 \sqrt[4]{\frac{I_w f}{1-C^4}} \sqrt[8]{\frac{g}{\gamma G}}$$

For steel, Equation 63a becomes for minimum stress design, (63b) $$d_{I(steel)} = 1.0481 \sqrt[4]{\frac{I_w f}{1-C^4}}$$

To find the length of shaft $l$ for a minimum stress design, which is dependent on the diameter $d_I$ from Equation 63a, then Equation 48 is used, which is repeated:

(48) $$\alpha \tan \alpha = \frac{I\mu l}{I_w}$$

The following can be substituted:

$$\alpha = l\omega \sqrt{\frac{\gamma}{gG}}, \text{ and } I\mu = I_p \frac{\gamma}{g} = \frac{\pi d^4(1-C^4)}{32}\frac{\gamma}{g}$$

Therefore, $$l\omega \sqrt{\frac{\gamma}{gG}} \tan l\omega \sqrt{\frac{\gamma}{gG}} = \frac{\pi d^4(1-C^4)}{32}\frac{\gamma}{g}\frac{l}{I_w}$$

To obtain $l_I$ for a minimum stress design, the value of $d_I$ from Equation 63, is inserted. Therefore, making this substitution, the resulting equation simplifies to:

(64) $$l_I = \frac{\pi}{3\omega}\sqrt{\frac{gG}{\gamma}}$$

or

(65) $$l_I = \frac{1}{6f}\sqrt{\frac{gG}{\gamma}}$$

For steel, Equation 65 further simplifies to:

(65a)
$$l_{I_{(steel)} (I_w>0)} = \frac{20,865}{f}$$

It is important to compare Equation 65a with Equation 37, which is the condition where there is no mass at the end of shaft of inertia $I_w$; Equation 37 is repeated:

(37)
$$l_{I_{(I_w=0) (steel)}} = \frac{31,297}{f}$$

Equation 37 does not require any specific diameter to obtain the frequency $f$, but Equation 65 does require the diameter as specified from Equation 63 or Equation 63a. If $f_n$, $I_w$, $d$, and $c$ ($c=d_1/d$) are known, the length of shaft can be calculated directly without solving the transcendent Equation 48 (this is not so if the frequency is unknown and is being solved for):

Since from Equation 56, $$\alpha = l\omega \sqrt{\frac{\gamma}{gG}} = 2\pi f l \sqrt{\frac{\gamma}{gG}}$$

Substituting in Equation 48 there is obtained:

$$2\pi f l \sqrt{\frac{\gamma}{gG}} \tan 2\pi f l \sqrt{\frac{\gamma}{gG}} = \frac{I_p \mu l}{I_w} = \frac{\pi d^4(1-C^4)l}{32 I_w} \cdot \frac{\gamma}{g}$$

Solving for $l$ gives

(66)
$$l = \frac{1}{2\pi f} \sqrt{\frac{gG}{\gamma}} \tan^{-1}\left(\frac{d^4(1-C^4)}{64 I_w f} \sqrt{\frac{\gamma G}{g}}\right)$$

Equation 66 is useful for determining the correct shaft length when a diameter $d$ (and constant $c$) must be chosen which does not conform to the minimum shaft stress from Equation 63 or 63a.

For steel, Equation 66 can be simplified somewhat:

(66a)
$$l = \frac{19,925}{f} \tan^{-1}\left(1,4353 \frac{d^4(1-C^4)}{I_w f}\right)$$

In most of the following equations, actual values for steel have been inserted ($G=11.5\times 10^6$, $g=386,088$, and $\gamma=0.2833$).

*Deflection equation*

Combination Equations 41 and 50 there is obtained (41a)
$$\phi_{(x)} = \phi_1 \frac{\sin \frac{x}{l}\alpha}{\sin \alpha}$$

and since $$\alpha = 2\pi f l \sqrt{\frac{\gamma}{gG}}$$

(41b)
$$\phi_{(x)} = \phi_1 \times \frac{\sin 5.0189 \times 10^{-5} fx}{\sin 5.0189 \times 10^{-5} fl} = \phi_1 \frac{\sin(.0028756 fx)°}{\sin(.0028756 fl)°}$$

*Stress equation*

Equation 52 can be written:

(52a)
$$S_{(x)} = \frac{d\phi_1 G}{2l} \alpha \frac{\cos \frac{x}{l}\alpha}{\sin \alpha}$$

Since $$\alpha = 2\pi f l \sqrt{\frac{\gamma}{gG}}$$

(52b)
$$S_{(x)} = d\phi_1 G \pi f \sqrt{\frac{\gamma}{gG}} \frac{\cos 2\pi f x \sqrt{\frac{\gamma}{gG}}}{\sin 2\pi f l \sqrt{\frac{\gamma}{gG}}}$$

where $S_{(x)}$ is the stress at the outermost fiber at a section distance $x$ from the "built-in" end of the torsion bar, and where $l$ is related to $d$, $c$, $I_w$, and $f$ by Equation 66 or Equation 66a. For steel, Equation 52 simplifies to (52c)
$$S_{(x)} = 288.59 d\phi_1 f \frac{\cos 5.0189 \times 10^{-5} fx}{\sin 5.0189 \times 10^{-5} fl} \text{(radians)}$$

or (52d)
$$S_{(x)} = 288.59 d\phi_1 f \frac{\cos(.0028756 fx)°}{\sin(.0028756 fl)°}$$

In Equation 61, letting $\omega=2\pi f$, and rearranging, (61a)
$$S_{(o)} = \sqrt{\frac{4096 \pi^2 f^4 I_w^2 \phi_1^2/(1-C^4)^2}{d^6} + \frac{\pi^2 f^2 \phi_1^2 \gamma G d^2}{g}}$$

The form of Equation 61a is convenient for plotting, and for steel can be simplified to:

(61b)
$$S_{(o)} = \sqrt{\frac{40,426 f^4 I_w^2 \phi_1^2/(1-C^4)^2}{d^6} + (83,284 f^2 \phi_1^2) d^2}$$

where $S_{(o)}$ is the stress in the outermost fiber of the torsion bar adjacent to the built-in end ($X=0$).

Since the inertia torque of the wheel $-\phi_{1(1)} \omega^2 I_w$, the value of the stress, $S_{(l)}$, at the outermost fiber of the torsion bar at the point where the wheel of inertia $I_w$ is attached to the bar ($x=l$) is:

(67)
$$S_{(l)} = \frac{d\phi_1 \omega^2 I_w}{2 I_p}$$

Since $$I_p = \frac{\pi d^4(1-C^4)}{32}$$

and $\omega=2\pi f$, (67a)
$$S_{(l)} = \frac{64\pi \phi_1 f^2 I_w}{d^3(1-C^4)}$$

Equations 67 and 67a can be verified by substituting $x=l$ in Equation 52a, which gives a term $\alpha \cot \alpha$, which can be simplified, reducing to Equation 67a.

The value of $S_{(o)}$ can be obtained by substituting the value of $d_1$ from Equation 63 into Equation 61. This is accomplished by making the substitution $$d = \sqrt[8]{\frac{3A}{B}}$$

into Equation 62. Calling this idealized stress at $x=0$, $S_{(o)I}$, there is obtained

(68)
$$S_{(o)I} = \left(\frac{A}{d^6}+Bd^2\right)^{1/2} = \left(\frac{A}{\left(\frac{3A}{B}\right)^{3/4}}+B\left(\frac{3A}{B}\right)^{1/4}\right)^{1/2}$$

$$= (AB^3)^{1/8}\left(\frac{1}{\sqrt[4]{27}}+\sqrt[4]{3}\right)^{1/2}$$

but

(69)
$$A = \frac{256 I_w^2 \omega^4 \phi_1^2}{\pi^2(1-C^4)}, \text{ and } B = \frac{\phi_1^2 \omega^2 \gamma G}{4g}$$

Since $\omega=2\pi f$, substituting in Equations 69 and then substituting the altered equations for A and B in Equation 68, gives

(70)
$$S_{(o)I} = 11.771 \phi_1 \sqrt[4]{\frac{I_w f^5}{1-C^4}} \times \sqrt[8]{\left(\frac{\alpha G}{g}\right)^3}$$

For steel:

(70a)
$$S_{(o)I (Steel)} = 349.26 \phi_1 \sqrt[4]{\frac{I_w f^5}{1-C^4}}$$

FIGURE 14 shows plots of frequency $f$ versus idealized shaft length $l$, with corresponding plots of idealized shaft diameter $d_I$ and idealized maximum stress $S_{(o)I}$ for several wheel inertias $I_w$. These curves are for a sixty-four-character type wheel and steel torsion shafts, based on Equations 65a, 63b, and 70a, respectively. The curves shown in FIGURE 14 are useful for obtaining preliminary design information when the wheel inertia $I_w$ and the frequency are known. The dotted curves are for a hollow shaft for one wheel inertia only ($2.50 \times 10^{-3}$ lb./in./sec.$^2$), and have been computed with a diameter ratio $c$, equal to 0.600. It should be noted that a relatively small change occurs in the outside diameter $d_I$ and maximum stress $S_{(o)I}$ when the shaft is made hollow. It is seen that, weight for weight, a hollow shaft with a thin wall section is about twice as strong in torsion as a solid shaft. However, other considerations, such as cost of manufacture, dimensional stability, maximum stress $S_{(o)}$ at surface, resistance to "body forces," etc., do not always dictate the use of a hollow shaft in preference to a solid shaft.

In the serial printer embodiment of the present invention (FIGURES 1 to 6), the exact shaft 3 length (assuming $\gamma = 0.2833$, and $G = 11.5 \times 10^6$) is calculated from Equation 65a, as follows:

$$l_{I\ (Steel)} = \frac{20{,}865}{f_n} = \frac{20{,}865}{2800} = 7.4518 \text{ inches}$$

Also, the idealized diameter and stress from Equations 63b and 70a is calculated as follows:

$$d_{I\ (Steel)} = 1.0481 \sqrt[4]{\frac{I_w f_n}{1-C^4}}$$

$$= 1.0481 \sqrt[4]{0.82900} = 1.000 \text{ inches}$$

This particular shaft diameter was not accidental; rather, the inertia of the type wheel 10 was adjusted to give the unity value.

(63b)
$$S_{(o)I\ (Steel)} = 349.26 \phi_1 \sqrt[4]{\frac{I_w f_n^5}{1-C^4}}$$

Letting $\phi_1 = 0.019834$ radians (1.136°),
Therefore, $$S_{(o)I\ (Steel)} = 6.9272 \sqrt[4]{50.955 \times 10^{12}}$$

$=18{,}508$ pounds per square inch maximum shear stress.

The two curves in FIGURE 15 illustrate the effect of varying the shaft length $l$ from the "idealized" length of 7.4518 inches just shown calculated. It should be noted that the stress $S_{(o)}$ goes to infinity at $l=0$ and $l=11.1775$ inches. The latter length is that computed from Equation 37, which is true only when $I_w = 0$; therefore, shaft size becomes infinite to satisfy this length when there is an added mass of inertia $I_w$ at the end of the shaft.

To emphasize the usefulness of the present invention, one can imagine that the conventional intermittent motion device 41 (paper-indexing mechanism of FIGURES 1 and 5) is operated so that the wheel 49 advances at a rate of 2,800 indexes per second, which would compare directly to the indexing action of the type wheel 10. To accomplish this would require that the shaft 42 be driven at 168,000 r.p.m. ($2{,}800 \times 60$). It is readily apparent that this is not possible.

FIGURE 16 shows the basic control of both the print hammer actuating mechanism or hammer actuator 16 and the fly wheel 8 drive motor 14. The hammer actuator 16 control is conventional and includes means for indicating the rotational position of the type wheel 10 relative to the hammer 17. Accordingly, an electronic counter 300 is electrically indexed according to the position of the type wheel 10 by an associated pulse amplifier 301, which, in turn, is operated under the control of a magnetic read transducer 71. The transducer 71 senses or reads both the evenly-spaced magnetic marks 72 and the extra magnetic mark 73, which are associated with the fly wheel 8. The reading of the extra magnetic mark 73 resets the counter 300 once for each revolution of the fly wheel 8 and is accomplished by a resistor-capacitor timing circuit in the pulse amplifier 301, which discriminates between the short time interval of the extra pulse 73 and the evenly-spaced marks 72. A compare circuit 302 is provided and functions to compare the signals on the data lines 303 and the output signals of the counter 300 in order to present an electrical output signal to a hammer driver circuit 304 to energize the hammer actuator 16 whenever the signals presented on the data lines 303 and the output signal of the counter 300 correspond to the same information character. The output signal of the compare circuit 302 is applied to a gate 305, which is opened by the print signal from the pulse amplifier 301. The print signal corresponding to the evenly-spaced marks 72 on the fly wheel 8 has a time interval shorter than the output of the compare circuit 302 and thus provides a precise time for opening of the gate 305 and energization of the hammer driver circuit 304.

The servo loop control for the motor 14 comprises the magnetic oscillator 20, the position sensor or linear variable differential transformer 35, a sensor amplifier 306, and a controller 307. The sensor 35, the sensor amplifier 306, and the controller 307 are well known in the art. For example, the sensor 35 may comprise the standard linear variable differential transformer Series SS, Type 033SS-L described in Bulletin AA-2 of Schaevitz Engineering Company, Camden, N.J., United States of America.

The following description explains the development of an error signal by means of the magnetic oscillator 20 and sensor 35 combination. The mechanical structure and interconnection of these elements have been described previously.

Considering that the printer system is in resonance, or that the fly wheel 8 speed is $f_n/T$ revolutions per second, it is observed that the magnetic oscillator 20 achieves a steady-state configuration as represented by angle $\delta$ in FIGURE 17, which is a view similar to FIGURES 7 and 8. Once again, the line OX represents an effective dwell midpoint, and the angle $\delta$ defines the angular displacement of the stator teeth 23a from the effective dwell midpoints of the rotor teeth 21a.

One way to describe the action of the magnetic oscillator 20 is to imagine that the fly wheel 8 is clamped to the bracket 4 (FIGURES 1 and 2) and remains stationary with respect to the base 33, and that the rotor 21 and the type wheel 10 both oscillate symmetrical to the OX axis. Then, if the stator 23 of the magnetic oscillator 20 is rotated at a constant speed $n$, or at the same speed at which the fly wheel 8 was rotated when the stator 23 was stationary, the action is identical to the previous configuration (FIGURE 17), neglecting bearing and air effects.

It can be assumed further that one is not interested in the motion of the type wheel 10 but only interested in the motion of the rotor 21. Therefore, FIGURE 17 simplifies to FIGURE 18, which shows nine progressive views of the concept just described. The direction of the rotation of the stator 23 in FIGURE 18 has been chosen to be comparable to the action represented by FIGURE 17 and is the basis for the equations which follow. One advantage of this approach is that the arrows in FIGURE 18 indicating direction of rotation of the rotor 21 and the stator 23 in FIGURE 18 are both related to ground or line OX, which makes it more convenient to visually compare the rotor 21 and stator 23 motion.

In FIGURE 18, one of the rotor teeth 21a, designated R, is shown acting on a single stator tooth, designated S. The rotor tooth motion is defined by $\phi_{1(x)} = \phi_x \sin 2\pi f_n t$, with reference to OX. The motion of the (imaginary) revolving stator 23 is given by $$\tau = \delta + \frac{2\pi f_t t}{T}$$

Figure 18C:
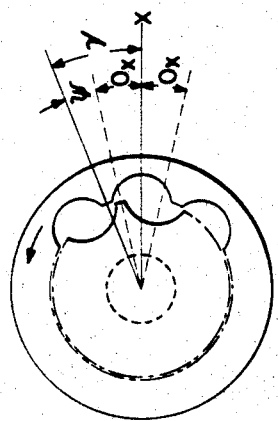
Figure 18B:
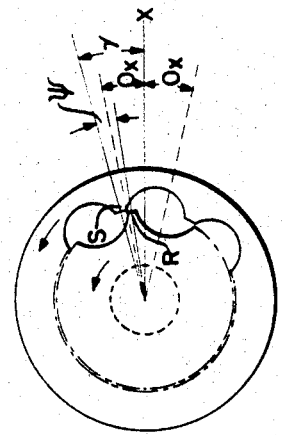
Figure 18A:
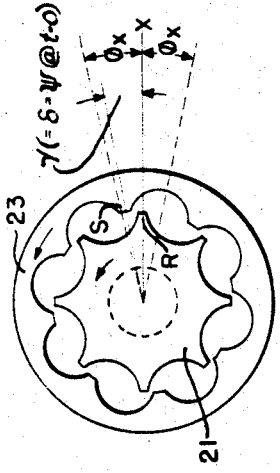
Figure 18F:
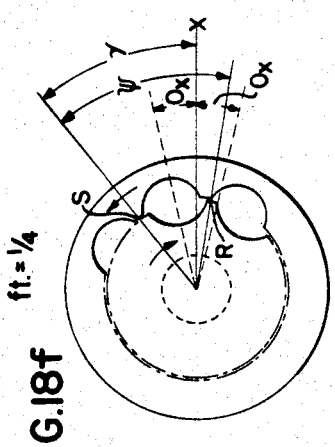
Figure 18E:
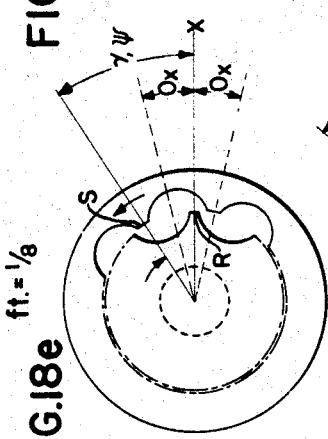
Figure 18D:
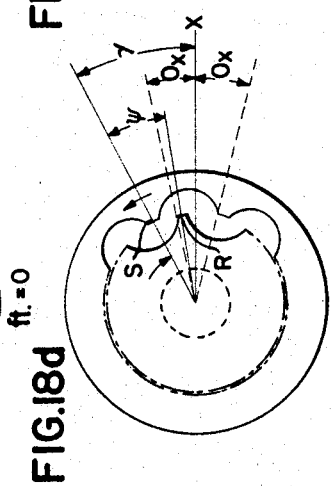
Figure 18I:
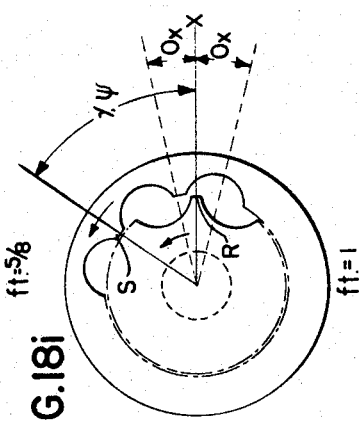
Figure 18H:
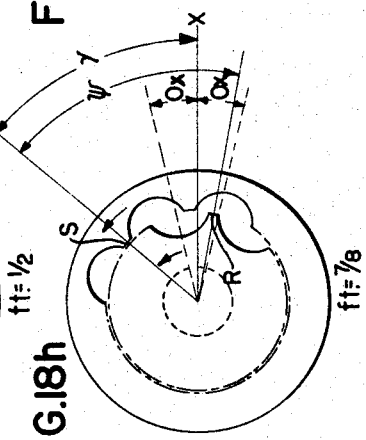
Figure 18G:
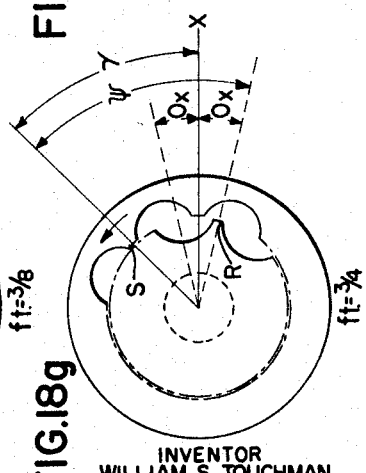

The angle $\phi_{1(x)}$ represents the instantaneous angle of twist of the torsion shaft 3 at the rotor 21 position (section X—X) and at $f_t = 0$, ($t = 0$), FIGURE 18a, $\phi_{i(x)} = 0$, and $\gamma = \delta$.

Since angle $\Psi$ equals the angle between the rotor and stator teeth, or between R and S in FIGURE 18, the following may be written.

$$\psi = \tau - \phi_{i(x)} = \delta + \frac{2\pi f_t t}{T} - \phi_x \sin 2\pi f_n t$$

Assume that a sinusoidal torque is developed as the rotor teeth pass one location of the stator teeth to the next. This can be accomplished by proper design of the rotor and stator teeth, if desired, for at least one level of direct current coil 27 excitation. Since the angular spacing between rotor teeth is $$\frac{2\pi}{T}$$

radians, the sinusoidal "torque angle" is $$\frac{\psi}{\frac{2\pi}{T}} \times 2\pi = \psi T$$

When $\Psi = 0$, the instantaneous torque is zero. Therefore,

(71) $\qquad L_i = L_o \sin \psi T$ where $L_i$ = the instantaneous torque on the rotor 21, and $L_o$ = the maximum instantaneous magnetic torque on the rotor 21.
Therefore,

(72) $\qquad L_i = L_o \sin (\delta T + 2\pi f_t t - \phi_x T \sin 2\pi f_n t)$

Before proceeding further, it is well to define the meaning of the torque Equation 72. As Equation 72 is written, the magnetic torque acts on an excitation rotor undergoing an assumed pure harmonic (sinusoidal) motion. Since the instantaneous torque $L_i$ is not harmonic, it cannot be in phase with the rotor velocity, for maximum power input, during all instants of a complete cycle. For a relatively high frequency-high inertia system, the rotor will undergo an essentially harmonic motion, while for a relatively low frequency-low inertia system, the non-harmonic excitation may distort the system's harmonic motion. Since the invention is more concerned with the former area, Equation 72 applies to the system described.

The characteristics of the magnetic oscillator device 20 action can be determined by a calculation of the work per cycle from Equation 72. The work integral is $$W \text{ per cycle} = \int_0^{\frac{1}{f_n}} L_i \omega_i \, dt \qquad (73)$$

where $\omega_i$ is the instantaneous angular velocity of the rotor 21. And, since $$\omega_i = \frac{d}{dt} \phi_{i(x)} = \frac{d}{dt} (\phi_x \sin 2\pi f_n t) = 2\pi f_n \phi_x \cos 2\pi f_n t \qquad (74)$$

Therefore, $$W = 2\pi f_n L_o \phi_x \int_0^{\frac{1}{f_n}} \sin (\delta T + 2\pi f_t t - \phi_x T \sin 2\pi f_n t) \cos 2\pi f_n t \, dt \qquad (75)$$

where W is th excitation energy per cycle. The excitation energy W per cycle is equivalent to the energy losses per cycle for any given steady-state condition. The internal damping of the torsion shaft 3 material at high stress levels is generally the major energy loss per cycle. The maximum angle of twist $\phi_x$ and the stator 23 phase angle $\delta$ are related to the energy losses in the system and will be shown presently. For example, let $\phi = 2\pi f_n t$ (76)

$\phi' = 2\pi f_t t$ (77)

$X = \phi_x T$ (78)

and $Y = \delta T$ (79)

Substituting Equations 76 through 79 into Equation 75 gives $$W = \frac{L_o}{T} \times \int_0^{2\pi} \sin (Y + \phi' - X \sin \phi) \cos \phi \, d\phi \qquad (75a)$$

It is apparent from Equations 76 and 77 that $\phi'$ is closely related to $\phi$ and at resonance are equal. However, if it is assumed that both $f_t$ and $f_n$ do not change during any given cycle, the following may be written:

$$\phi' = B\phi \qquad (80)$$

where $\beta = 1$ at resonance. The foregoing assumption is a good one for relative high frequency, high inertia systems, since the period $$\frac{1}{f_n} \left( \text{and } \frac{1}{f_t} \right)$$

is so short. Substituting Equation 80 in Equation 75a gives:

$$W = \frac{L_o}{T} \times \int_0^{2\pi} \sin (y + \beta\phi - x \sin \phi) \cos d\phi \qquad (75b)$$

In Equation 75b, parameters X, Y, and $\beta$ are constant over the cycle being integrated, with the angle $\phi$ as the independent variable. The same notation can be applied to Equation 72 for the instantaneous torque:

$$L_i = L_o \sin (y + \beta\phi - x \sin \phi) \qquad (72a)$$

The simplest case to describe is the steady-state condition at resonance, where $f_t = f_n$, or $\beta = 1$.
Therefore Equation 72 becomes:

$$L_{i(Res.)} = L_o \sin (\sigma T + 2\pi f_n t - \phi_x T \sin 2\pi f_n t) \qquad (81)$$

and Equation 72a becomes:

$$L_{i(Res.)} = L_o \sin (y + \phi - x \sin \phi) \qquad (81a)$$

Also, Equation 75 becomes:

$$W_{(Res.)} = 2\pi f_n L_o \phi_x \int_0^{\frac{1}{f_n}} \sin (\delta T + 2\pi f_n t - \phi_x T \sin 2\pi f_n t) \cos 2\pi f_n t \, dt \qquad (82)$$

and Equation 75b becomes:

$$W_{(Res.)} = \frac{L_o}{T} \times \int_0^{2\pi} \sin y + \phi - x \sin \phi) \cos \phi \, d\phi \quad (82b)$$

A computer investigation of Equation 82b has shown that maximum work per cycle at resonance is obtained when the parameter $y$ ($\delta T$) equals $\pi/2$ regardless of the value of the parameter $X$ ($\phi_x T$). Therefore, for example, at resonance $\delta$ establishes itself as $\frac{1}{4}$ the angle between two successive rotor teeth 21a, or $\pi/2T$ radians. In the serial printer embodiment of the present invention (FIGURES 1 through 6), this angle at resonance is theoretically equal to $$\frac{\pi}{2(56)}$$

(0.02805 radians or 1.607 degrees) assuming that a sinusoidal torque is developed as the rotor teeth 21a pass from one location of the stator teeth 23a to the next. Practically, this angle does appear at resonance even though the rotor and stator teeth 21a and 33a were not designed to achieve the sinusoidal torque capability.

From Equation 72, the equation for average torque for one cycle of the oscillation frequency may be written as follows:

$$L_{AVE.} = \frac{L_o}{\frac{1}{f_n}} \int_0^{\frac{1}{f_n}} \sin (\delta T + 2\pi f_t t - \phi_x T \sin 2\pi f_n t) \, dt \qquad (83)$$

or, using the relations of Equations 76 and 77:

$$L_{AVE.} = \frac{L_o}{2\pi} \int_0^{2\pi} \sin(\delta T + \phi' - \phi_x T \sin \phi) d\phi \quad (84)$$

At resonance, $\phi' = \phi$, $\delta T = \pi/2$, and the following can be written:

$$L_{AVE.} = \frac{L_o}{2\pi} \int_0^{2\pi} \cos(\phi - \phi_x T \sin \phi) d\phi \quad (85)$$

But, $$J_n(X) = \frac{1}{\pi} \int_0^{\pi} \cos(n\phi - X \sin \phi) d\phi$$

Since $X = \phi_x T$, and $n = 1$, therefore $$2J_1(\phi_x T) = \frac{2}{\pi} \int_0^{\pi} \cos(\phi - \phi_x T \sin \phi) d\phi$$

Since the curve is symmetrical about $\phi = \pi$ $$2\pi J_1(\phi_x T) = \int_0^{2\pi} \cos(\phi - \phi_x T \sin \phi) d\phi$$

Therefore, using the above equation and Equation 85 gives $$L_{ave.} = L_o u_1(\phi_x T) \quad (86)$$

From Equation 86 the average torque on the stator 23 of the magnetic oscillator 20 can be determined, using a table of Bessel functions for $J_1(X)$. For example, when $\phi_x T = 1$, (single instantaneous dwell of rotor teeth 21a per cycle), $l_{ave.} = 0.4401 L_o$, or the average torque is 44% of the maximum torque. When $\phi_x T = 1.8412$, the amplitude at which the magnetic oscillator 20 is most efficient at resonance, the average torque on the stator 23 becomes a maximum and is 58.2% of the maximum torque.

With the system at resonance, a small change in the forcing frequency $f_t$ causes an appreciable change in the average torque ($l_{ave.}$) on the stator element 23. This change in average torque increases or decreases, depending on which direction the forcing frequency $f_t$ changes from the resonant shaft frequency $f_n$. The change in torque on the stator 23 reacts with the springs 36 and 37 (FIGURES 1 and 3), displacing the core 34 in the transformer 35, thereby creating an error signal for use in the servo loop (amplifier 306, controller 307 of FIGURE 16) for control of the motor 14.

As a result of the computer investigation of Equation 82b, $\pi/2$ can be substituted for $y$ in this equation. Therefore, $$W_{RES./cycle} = 2\frac{L_o}{T} \times \int_0^{\pi} \cos(\phi - X \sin \phi) \cos \phi \, d\phi \quad (87)$$

The change $2 L_o/T$ and $\pi$ from $L_o/T$ and $2\pi$ is all right, since the curve is symmetrical about $\phi = \pi$. Letting $\phi - X \sin \phi = A$, and $\phi = B$, and since $\cos A \cos B = \frac{1}{2} \cos(A-B) + \frac{1}{2} \cos(A+B)$, the following can be written:

$$W_{RES.} = \frac{L_o}{T} \times \int_0^{\pi} \cos(-X \sin \phi) d\phi +$$

$$\frac{L_o}{T} \times \int_0^{\pi} \cos(2\phi - X \sin \phi) d\phi \quad (88)$$

Both terms of Equation 88 are forms of the Bessel function.

From page 281, "Advanced Calculus," by Frederick S. Woods (1934, Ginn and Company), and since $\cos(-X \sin \phi) = \cos(X \sin \phi)$, $$\cos(-X \sin \phi) = J_0(X) 2 J_2(X) \cos 2\phi + 2 J_4(X) \cos 4\phi \quad (89)$$

Integrating the Bessel function term by term from 0 to $\pi$ gives $$\int_0^{\pi} \cos(-X \sin \phi) = \pi J_0(X) \quad (90)$$

Also from Woods, page 282:

$$J_n(X) = \frac{1}{\pi} \int_0^{\pi} \cos(n\phi - X \sin \phi) d\phi \quad (91)$$

When $n = 2$, Equation 91 becomes the desired second term of Equation 88; therefore, the complete analytical solution of Equation 88 becomes $$W_{RES.} = \frac{L_o}{T} \pi \times (J_0(X) + J_2(X)) \quad (92)$$

Also from Woods, pages 277 to 279:

$$J_0(X) + J_2(X) = \frac{2}{X} J_1(X) \quad (93)$$

Therefore, $$W_{RES.} = 2\pi \frac{L_o}{T} J_1(X) \quad (94)$$

Inserting the general form for the Bessel expansion for $J_1(X)$ in Equation 94 gives $$W_{RES.} = 2\pi \frac{L_o}{T} \left( \frac{X}{2} - \frac{X^3}{2^3 2!} + \frac{X^5}{2^5 2! 3!} \cdots + (-1)^k \frac{X^{2k+1}}{2^{2k+1} K!(K+1)!} \right) \quad (95)$$

($0! = 1$, which gives the first term of the expansion when $k = 0$). Tables of Bessel functions evaluate $J_1(X)$ for various values of $X$.

Investigating the Bessel function in connection with Equation 92 shows that W is maximum when $X = 1.8412$ and W goes to zero when $X = 3.8317$. This corresponds to values of $$\phi_x \text{ of } \pm \frac{1.8412}{T} \text{ and } \pm \frac{3.8317}{T}$$

respectively. As an example, if $T = 64$, the corresponding angles will be $\pm 0.028769$ radians ($\pm 1.648°$) and $\pm 0.059870$ radians ($\pm 3.430°$).

FIGURE 19 is a plot of the relative torque versus cycle time and can be compared visually with the nine progressive views of FIGURE 18. Similarly, FIGURES 20 through 22 are plots of the work function for three values of the parameter X including the value for maximum work when $X = 1.8412$ (FIGURE 20). The plot of FIGURE 20 can also be directly compared with the views of FIGURE 18.

On the basis of the foregoing analysis, it is apparent that the most efficient operation of the magnetic oscillator 20 is obtained when, during steady state operation, the excitation rotor 21 oscillates through an angle $\phi_x$ of $$\pm \frac{1.8412}{T}$$

radians. However, it is often not necessary and often not possible to locate the magnetic oscillator 20 to achieve this ideal operation. For example, in the serial printer embodiment of the present invention (FIGURES 1 through 6), the type wheel 10 (FIGURE 2) itself does not oscillate through an ideal angle, but rather oscillates through a much smaller angle, such as $$\pm \frac{1}{T}$$

radians for a single instantaneous dwell per cycle, as previously described. Also, it is not convenient to locate the magnetic oscillator 20 in the proximity of the type wheel 10, but, rather, it is convenient to locate it in some position which does not interfere with the printing operation.

Therefore, it becomes necessary to develop a design procedure which will be satisfactory for any location of the magnetic oscillator 20 and which will not specify a construction permitting excessive torsional stresses.

The first step is to equate Equation 94 with the energy loss of the system per cycle. As pointed out previously, the internal damping of the torsion bar 3 material may be the major energy loss per cycle. According to A. W. Cochardt ("The Origin of Damping in High-Strength Ferromagnetic Alloys," No. 52–A–21, Journal of Applied Mechanics, Trans. ASME, June 1953), the origin of damping in metals has been traced to four sources: plastic flow, the thermoelastic effect, the magnetoelastic effect, and atomic diffusion. Plastic flow is certainly the most common cause of damping; in high-strength alloys, however, plastic flow occurs noticeably only at stress levels beyond those for which the structure is designed. Damping due to the thermoelastic effect becomes noticeable only at a critical frequency, whereas the damping attributed to interstitial diffusion of atoms is important only at low stress levels and is also associated with a critical frequency. Consequently, only the magneto-mechanical effect contributes significantly to the large damping capacity in high-strength alloys; and this effect, of course, is limited to ferromagnetic material.

Assuming that the damping present may be considered viscous damping (this is probably true for certain materials at relatively low stress levels; for steels and other ferromagnetic materials cycling over a high stress range, the damping force is strictly non-linear as well as being "structure" sensitive regarding volume and stress distribution), the damping torque $L_1$ has the amplitude $k(\dot{\phi}_{1_1})$ max.$=k\omega\phi_1$, where $k$ is the damping constant for the particular system under analysis and with reference to the member oscillating at an amplitude $\phi_1$. The damping torque is harmonic and at resonance is 90 degrees out of phase with the instantaneous angle of twist $\phi_{1_1}$. Since the work done on a harmonic motion by a harmonically varying force when the force is in phase with the velocity of motion is $$W \text{ (per cycle)} = \pi L_1 \phi_1 \quad (96)$$

and since $$L_1 = k\omega\phi_1 = 2\pi f_n k \phi_1$$

$$W \text{ (per cycle at resonance)} = \pi \omega k \phi_1^2 = 2\pi^2 f_n k \phi_1^2 \quad (97)$$

Equation 97 may be equated directly to Equation 94; therefore, $$2\pi^2 f_n k \phi_1^2 = \frac{2\pi L_o}{T} \cdot J_1(\phi_x T), \quad (98)$$

or $$k = \frac{L_o}{\pi \phi_1^2 T f_n} \cdot J_1(\phi_x T) \quad (99)$$

The damping constant $k$ applies to one system design only; therefore, since $T$ and $f_n$ do not vary for a given design, all constants can be lumped together, giving a new damping constant $k'$;

$$k' = \frac{L_o J_1(\phi_x T)}{\phi_1^2} \quad (100)$$

Once $k'$ has been determined for a given system, the amplitude of oscillation can be determined by the equation:

$$\phi_1 = \sqrt{\frac{L_o J_1(\phi_x T)}{k'}} \quad (100a)$$

Equation 98 is an important one, since it relates the energy of damping with the excitation energy and shows that in the final analysis the internal damping of the system limits the angle of oscillation of both the excitation rotor 21 and the type wheel 10 (or drum) being oscillated. Therefore, the parameters of the magnetic oscillator 20 and its location should be so chosen that, at the maximum value of the oscillator's magnetic flux, the amplitude of oscillation of the type wheel 10 (or drum) will be only slightly greater than that required for proper operation of the intermittent motion device of the present invention. In a mechanism built in accordance with the foregoing design philosophy, it becomes impossible to put a level of excitation energy into the system which will cause unsafe torsional stresses to be intermittently present in the system.

In general, Equation 98 suggests that damping should be low for an efficient, compact device. However, if damping is too low, it becomes more difficult to assure the safety of the device, since slight differences in excitation will cause large differences in amplitude of oscillation.

In addition, the selection of a material for the shaft or torsion bar 3 must be directed toward the required stress value. For example, the use of alloy aluminum or titanium for torsion bar construction may be required to keep damping low, since, as pointed out previously, the magnetoelastic effect is not present in non-ferrous materials. Obviously, there is no need to make the type wheel 10 (or drum of FIGURE 20) of the same material as the torsion bars. Damping can be decreased in alloy steel torsion bars by their being subjected to a magnetic field during oscillation.

It should be noted that the rotor 21, secured by splines 22 (FIGURES 2 and 3) to the shaft 3 alters the shaft stiffness for the length of the rotor. After the rotor length is added to the computed shaft length of 7.4518 inches, a length of the 1.000-inch diameter shaft equivalent in stiffness to the rotor section is subtracted from the new shaft length. The shaft length of 1.000 inch diameter equivalent to the rotor section, which is 1.000 inch long and 1.500 inches in diameter, may be calculated as follows:

$$\text{(equivalent)} = \frac{(1.000)^4}{(1.500)^4} \times 1.000 = 0.1975 \text{ inches.}$$

Therefore, the corrected length for the shaft 3 will be $$\text{(corrected)} = 7.4518 + 1.000 - 0.1975 = 8.2543 \text{ inches}$$

This substitution keeps the shaft stiffness equal to the original calculated value but slightly alters the frequency, since the shaft inertia increases. Also, since the rotor 21 is a localized mass, the deflection curve of the shaft 3 changes somewhat from the given Equation 41b. The shaft fillets at the rotor 21 and at the shaft 3 junctions of the fly wheel 8 and the type wheel 10 effect the shaft stiffness and must be taken into account for a more accurate calculation.

FIGURES 23 through 27 show another embodiment of the present invention; that is, the use of the intermittent motion device for a relatively slow speed application—namely, a motion picture projector. The perspective view of FIGURE 23 shows a 180-revolutions-per-minute geared head synchronous motor 74 arranged to drive shafts 75 and 76 and a timing pulley 77 attached to the output shaft of the motor 74 driving a timing belt 79, which meshes with timing pulleys 75a, 76a, and 77. The timing pulleys 75a, 76a, 77, and 78 all have the same number of teeth.

The shafts 75 and 76 drive the respective film sprockets 75b and 76b at a steady rotation of 180 revolutions per minute. Since the film sprockets 75b and 76b each have eight pairs of teeth 80, the film 81 is advanced at a rate of 1,440 frames per minute, or 24 frames per second.

The motion picture projector uses the usual film reels 82 and 83 and spring slip belt 84 for maintaining a slight film tension between the sprocket 76b and the lower reel 83. Also, a pulsed-discharge lamp 85 replaces the usual light shutter. Film loops 86 and 87 are for the usual purpose of allowing the transition from a steady motion of the film 81 to an intermittent motion, which is required as the film 81 passes the gate 88. Another film loop 89 forms once during each film advance cycle of the film advance or indexing sprocket 90, having no relation to the function of the film loops 86 and 87.

The film advance sprocket 90 has a shaft portion 90a, which is journalled in a double row ball bearing 91 and a hollow shaft portion 90b bored to receive an enlarged end 92a of the torsion shaft 92. A fly wheel 93 is secured to the hollow shaft portion 90b by three evenly-spaced set screws 94 (FIGURE 24) in tapped holes 95 in the fly wheel 93. Also, in the tapped holes 95 there are three set screws 96, which have plastic lock devices 96a serving to prevent movement of the screws 96.

By adjusting each of the three set screws 96, it is possible to change the rotational inertia of the fly wheel 93 and still maintain a rotational balance with respect to the center line of the torsion shaft 92. Similarly, the fly wheel 97, of greater rotational inertia than the fly wheel 93, is secured to the shaft portion 92c, which is an enlarged portion of the torsion shaft 92, particularly of the short length section 92d, which is equal in diameter to the main torsion shaft 92. The wheel 97 is secured to the solid shaft portion 92c by three evenly-spaced set screws 98 in tapped holes 99. Set screws 100, larger than the screws 96 in the fly wheel 93 and containing plastic locks 100a, serve to adjust the rotational inertia of the fly wheel 97.

The fly wheel 97 is attached to the excitation rotor 101 by means of a metal spring diaphragm 102, which is secured to the fly wheel 97 by a plurality of set screws 103 and to the rotor 101 by a plurality of rivets 104. The diaphragm 102 allows motion of the fly wheel 97 in a direction parallel to the center line of the torsion shaft 92 but prevents all rotation of the fly wheel 97 with respect to the rotor 101.

The rotor 101 is provided with eight evenly-spaced teeth 101a, which magentically react with eight internal teeth 105a (FIGURE 25) of a stator ring 105. The rotor 101 is free to rotate on bearings 106, which are journalled on a pin 107, which is pressed into the stator 108 (FIGURE 24). The rotor 101, the stator ring 105, and the stator 108 are all made of magnetically soft material. A ring magnet 109 is cemented to the stator ring 105 and the stator 108 and is preferably made of a material such as Alnico V and is magnetized to provide flux paths 110 across gaps 111 (FIGURE 25) between the rotor and stator teeth 101a and 105a, respectively. The flux path also crosses another gap 112 (FIGURE 24), which allows running clearance for the rotor 101. A magnetic flux by-pass plate 113 (FIGURE 24) is adjustable in a direction parallel to the shaft 92 by means of three screws 114 with a turnable rivet end portion 114a. Adjustment of the screws 114 controls the amount of excitation imparted to the fly wheel 97. This system has no I²R coil loss, as in the prior serial printer embodiment of the present invention.

The stator 108 has a boss portion 108a journalled in a bore 115a in a bracket 115. A retaining plate 116 is secured to the boss portion 108a by means of screws 117. The angular position of the combined stator, shown generally at 118, is adjustable by means of a knob 119, which controls the angular position of a worm 120 meshing with a worm wheel segment 121.

The bracket 115 is secured to a plate 122 by means of bolts 123. The bearing 91 is mounted in a plate 124, which is secured to the plate 122 by means of spacers 125. The plate 122 has a boss portion 122a, serving to receive a ball bearing indicated generally at 126. The ball bearing at 126 allows free rotation of the pulley 77 concentric to the center line of the torsion shaft 92.

The ball bearing at 126 is constructed with no raceways, allowing radial as well as longitudinal motion. The flanged cylinder (or inner "race") 127 has a hardened and ground cylindrical outside diameter with a flange 127a secured to the pulley 77 by means of screws 128. A plurality of balls 129, forming two rings, as shown, are under slight compression between the cylinder 127 and a hardened steel cylinder 130.

The enlarged portion 92b of the torsion shaft 92 is a node between the two-mass system composed of the fly wheels 93 and 97; that is, during operation of the device, the fly wheel 93 always rotates in a direction opposite to that of the fly wheel 97, imparting no oscillatory motion to the shaft portion 92b. The forward rotation of the system is imparted by means of the pulley 77, as previously described, through a resilient cylinder 131 bonded to both the inner diameter of the cylinder 127 and the outer diameter of the enlarged shaft portion 92b. The resilient cylinder 131 allows the two-mass vibrating system to function completely undisturbed by the inertia of the pulley 77.

The fly wheel 93 adds to the rotational inertia of the sprocket 90 and is used to stabilize its amplitude of oscillation. After the combined inertia of the fly wheel 93 and the sprocket 90 is determined, the remaining parts of the system are readily designed. The low frequency (24 cycles per second) requires such a small diameter shaft 92 (0.078 inch in diameter in one particular design) that the inertia of the shaft 92 may be neglected entirely. The lengths of the torsion shafts are related by the expression (when shaft inertia is neglected):

$$\frac{I_1}{I_2} = \frac{l_2}{l_1}$$

The system of FIGURE 24 is easier to calculate than the high-frequency single-mass system of FIGURES 1 through 6, and, although the opposed motion between the sprocket 90 and the rotor 101 makes the operation appear more complex, the action is essentially the same.

FIGURE 26 shows nine progressive views of the film advance motion of the sprocket 90 for 9/8 cycle, including the oscillation of the rotor 101 and the steady rotation of the timing pulley or drive wheel 77. All views are taken as looking into the sprocket 90 (FIGURE 19). The line OX in all views is for a stationary reference only, and is not related to previous equations based on FIGURES 7, 8, and 17. An examination of the nine progressive views of FIGURE 26 shows the unsymmetrical balance of forces which sustains the vibration against the damping force.

FIGURE 27 is a plot of the effective dwell characteristics of the sprocket 90 and film 81 advance. Since the required dwell for the film is ¾ of a cycle, the film 81 actually backs up during this time, forming the loop 89. A method is available to prevent the backward motion of the sprocket 90 causing the formation of the loop 89. This can be accomplished by inserting a special coupling with a fixed amount of backlash between the torsion shaft end 92a and the sprocket shaft portion 90a. Introduction of this element changes the intermittent motion to a nonharmonic, or non-linear, mechanical spring system.

It should now be noted that a large angle of twist $\phi_1$ (0.725 radians) is required to achieve the long effective dwell cycle. The bearing at 126 and the diaphragm 102 are provided for the purpose of accommodating the shortening of the torsion shaft 92 as it twists to the maximum angle $\phi_1$. Adjustment of the inertia of the wheels 93 and 97 can serve to tune the resonant frequency of the shaft-wheel system to the synchronous forcing frequency of the combined stator member or magnetic oscillator 118.

FIGURE 28 is a cross-sectional view of the intermittent motion device of the present invention as embodied in a drum or parallel high-speed printer. The half of the mechanism not shown in FIGURE 28 is an exact mirror image of the half shown. The type drum 132 has raised characters indicated at 133 (FIGURE 29) on a surface 132a, preferably formed by a chemical machining operation. As an example, the formed or etched characters on the drum 132 can be arranged in 120 columns of 64 evenly-spaced characters around the circumference of the drum, making a total of 7,680 characters.

The type drum 132 has integral teeth 132b, which mate exactly with teeth 134a and 135a, which are integral with hollow torsion bars 134 and 135, respectively. These teeth, as shown, have a slight taper to facilitate removal of the drum 132 while retaining a self-locking action during operation. The opposite ends of the torsion bars 134 and 135 are splined to rotors 136 and 137, respectively. The rotors 136 and 137 operate in magnetic oscillators 138 and 139, respectively, which are identical in principle to the magnetic oscillator 20 of the serial printer embodiment (FIGURES 1 through 6).

The stators 140 and 140a are fastened together by a plurality of screws 141 and encase the excitation coil 142 of the magnetic oscillator 138. Similarly, stators 143 and 143a encase the excitation coil (not shown) of the magnetic oscillator 139.

The stator member 140 is secured to a support member 144 by means of a plurality of screws 145. The support member 144 has a boss portion 144a with a bearing surface 144b, which fits a bore in the bracket 146. The bracket 146 is radially split in its upper portion, as shown in FIGURE 28. The support member 144 may be rigidly secured to the bracket 146 by clamping the split section by means of a screw 147. Since the bracket 146 is secured to a base 148 (by means of bolts, not shown), a tightening screw 147 fixes the position of the stators 140 and 140a of the magnetic oscillator 138 relative to the base 148.

A bearing 149 is journalled in the support member 144, allowing a shaft portion 150a of a bearing hub 150 to rotate concentrically to a bearing surface 144b. A spring washer 151 forces the outer race of the bearing 149 to the right (FIGURE 28), preloading the bearing 149 to an average or constant value regardless of the longitudinal vibration of the bearing hub 150. A hardened steel sensing plug 152 is pressed into the shaft portion 150a and touches the needle of a phonograph crystal assembly 153, which is mounted on a spring 154 with a damping mass 155. The assembly 153 (or crystal pick-up) is used to detect the frequency $f_n$ directly, since the rotary motion of the system is not imparted to the needle. The needle point touches the flat surface of the sensing plug 152 at the center of rotation of the torsion bar 134 in order to eliminate objectionable background noise.

The torsion bar 134 is also supported at the nodal section O—O (FIGURE 28) and is driven at the same location by means of a belt 156. The belt 156 is a timing belt and engages teeth 157 on a sleeve 158, which serves to center the torsion bar 134 relative to the inner race of a ball bearing 159. The belt 156 provides a locating surface for a clock ring 160. The sleeve 158 contacts the torsion bar 134 at the surface 158a only, which is symmetrical to the nodal section O—O, as shown in FIGURE 28. The sleeve 158 is secured to the torsion bar 134 at the nodal section O—O by means of a plurality of evenly-spaced set screws 161, which bear on a like number of plastic slugs 162, which prevent scoring of the outer surface of the torsion bar 134. The ball bearing 159 is mounted in a bracket 163, which is secured to the base 148. The clock ring 160 is secured to the sleeve 158 by means of a set screw 164.

If a drum frequency of approximately 2,560 cycles per second is desired, then the drum r.p.m. will be equal to $(60/64)f_n$. In order to drive the hysteresis synchronous motors 167 and 168 at their rated speed of 1,800 r.p.m. using 60-cycle alternating current, it is necessary to divide the 2,560-cycles-per-second desired drum frequency by a ratio of 42 to 1. This division provides a motor frequency of approximately 61 cycles per second. The motors 167 and 168 are of the four-pole type. Accordingly, their r.p.m. will be equal to $(30/42)f_n$. Therefore, the drive ratios associated with the motors 167 and 168 are equal to $$\frac{60f_n/64}{30f_n/42}=21/16$$

The pulley 157 has 32 teeth, while the pulley on the motor 167 has 42 teeth. In addition, the pulleys associated with the motor 168 have the same number of teeth, providing the same drive ratios. In view of the foregoing, the system is driven at a speed which causes the magnetic oscillators 138 and 139 to create excitation frequencies which are exactly equal to the system's resonant frequency $f_n$.

The foregoing description, applicable to the torsion bar 134, also applies to the torsion bar 135. In order to prevent an excessive or unusable amount of runout of the type drum 132, the two torsion bars 134 and 135 and their associated bearing mountings have been fabricated with considerable precision.

The clock ring 160 is made of a soft magnetic material and operates in conjunction with a reluctance read head 165. For example, the clock ring 160 has sixty-three teeth 160a, arranged on a sixty-four-tooth spacing. The missing tooth forms a space 166, which is detected by the read head 165 and applied to the electronic counter 310 via the amplifier 311. The foregoing detection signal resets the electronic counter 310, while the hammer fire pulse from a gate 315 for the sixty-fourth character is obtained from a resistor-capacitor timing circuit in the amplifier 311, which is triggered by the signal pulse from the reluctance head 165 corresponding to the sixty-third character tooth (the sixty-fourth tooth space 166 is the one omitted from the clock ring 160). This latter timing circuit has a time duration of "one character time," or one sixty-fourth of the time for one revolution of the clock ring 160, and will remain constant, since the drum 132 speed is directly related to the shaft-drum system frequency $f_n$.

FIGURE 29 shows a speed control for the "modulated" type drum 132. The term "modulated" applies to the type drum 132, as it is a tuned element and an oscillation is imposed on its steady rotation. A pair of hysteresis synchronous motors 167 and 168 provide a power input to the nodal section of each of the torsion bars 134 and 135. Although a controller 317 supplies power to the motors 167 and 168 essentially in parallel, a trimming adjustment can be provided at the controller 317 to balance the input power to each of the torsion bars 134 and 135. The read head 165 develops electrical signals of frequency $f_t$, which are used for two purposes: after amplification by the amplifier 311, the signal becomes an input to the electronic counter 310, and to the gate 315, which controls the hammer driver circuits 314.

In the servo loop control, the resonant frequency $f_n$ signals (equal to $2f_n$) from the crystal assembly 153, after amplification by an amplifier 318, are frequency-divided by a frequency divider circuit 319 to a frequency compatible to the hysteresis synchronous motors 167 and 168. Power amplification for the motors 167 and 168 is accomplished by the controller 317, which includes phasing and frequency control.

Since the type drum 132 can act at a torsional spring, an unwanted vibration can be set up between the rotors 136 and 137. The torsional spring constant is equal to the sum of the constants for the torsion bar 134, the type drum 132, and the torsion bar 135. By using a read head 169 in conjunction with a clock ring 170, similar to the read head 165 and the clock ring 160, the phase relation between the rotors 137 and 136 (using the read head 165) can be monitored, using, for example, a conventional electronic phase shift indicator. The signal from the phase shift indicator (not shown) can then be used to control a suitable switch element, thereby providing a means of opening the circuit to coil leads 171 and 172 before a spurious vibration has time to build up to excessive amplitudes.

The extra crystal assembly 173 shown in FIGURE 29 is normally not needed, except that it can be used to compare the amplitude of oscillaiton of the torsion bar 135 with the amplitude of oscillation of the torsion bar 134, using the crystal assembly 153. In addition, the crystal assemblies 153 and 173 can be replaced with velocity heads which can measure the instantaneous velocity of the torsion bar 134 surface at the proximity of section *l—l*. A device which measures the surface velocity of the drum 132 will monitor the frequency of the oscillation $f_n$, regardless of the average forward speed and amplitude of oscillation of the drum 132 (or the type wheel 10, FIGURE 2), as shown previously by Equations 8 and 9.

Two basic methods using external read heads may be used to measure surface velocity. In the first method (not shown), a cylindrical conductor bonded to a cylindrical magnetic surface which is vertically oriented can be used, but the use of slip rings is necessary in this method. Since the slip rings would have the same intermittent motion as the oscillating drum 132, brush action would tend to be unfavorable and would impart unwanted friction at the critical point. In the second, more preferred, method, a high frequency pulse rate may be written on a cylindrical magnetic surface (not shown) which is integral with the oscillating drum 132 (or type wheel 10). A magnetic read head in combination with suitable electronic circuitry can monitor the envelope of the read head's output wave, which is the resonant frequency $f_n$.

In FIGURE 29, a ribbon 174 passes over rolls 175 in a manner to contact the type drum 132 lightly, and paper 176 is operated on from behind by a row of, for example, 120 print hammers in a print hammer unit 177.

The wall thickness of the type drum 132, as shown in FIGURE 28, is contoured in such a manner that there is a minimum of angular displacement between cross-sections 1—1 and *m—m* at the instant of maximum twist of the torsion bars 134 and 135. Sections *x—x* and 1—1 correspond to the maximum twist angles $\phi_x$ and $\phi_1$, respectively. The maximum angle of twist at the section *m—m* (the center of the type drum 132 where the wall thickness is the least) is $\phi_m$, which will always be slightly larger than $\phi_1$, depending on the drum wall thickness contour. However, the effective dwell midpoints will occur on a straight line which is parallel to the type drum 132 center line even though $\phi_m$ differs slightly from $\phi_1$. Proper selection of the operating levels of $\phi_1$ and the print hammer contact time insures that no visible differences in print quality occurs between the ends and the center of the type drum 132.

A facility, not shown, for easy type drum 132 removal is the mounting of the brackets 146 and 163 on a separate plate which can slide in a direction parallel to the type drum 132 center line and can be clampable to the base 148.

In FIGURE 29, the electronic counter 310 is electrically indexed according to the position of the type drum 132 by the pulse amplifier 311, which, in turn, is operated under control of the read head 165. The read head 165 senses or reads both the sixty-three teeth 160a and the space 166 of the clock ring 160. The reading of the space 166 resets the counter 310 once for each revolution of the type drum 132 and is accomplished by a timing circuit in the amplifier 311. A compare circuit 312 is provided and functions to compare the signals on the data lines 313 and the output signals of the counter 310 in order to present an electrical output signal to selected hammer driver circuits in the hammer drivers 314 whenever the signals presented on the data lines 313 and by the counter 310 correspond to the same information character. A hammer driver circuit such as 314a and 314b is provided for each of the 120 columns of type of the type drum 132. A selected hammer driver circuit is provided to energize a selected one of 120 printing hammers (not shown) of the print hammer unit 177. The specific printing hammer which is to be actuated to print is determined by which of the 120 gates, such as 315a and 315b, in the gate unit 315 has been opened by a column counter 322, to which is applied a periodically-recurring clock pulse signal from a clock pulse generator 321, which in turn is controlled by a memory unit in a data storage unit (not shown). The output signal of the compare circuit 312 is also applied to all of the gates in the gate unit 315. If the compare circuit 312 develops an output signal when the signals on the data lines 313 correspond to the character in the first space of a line of intelligence information, the gate 314a will be opened by the column counter 322, and the first print hammer at the left end of the print hammer unit 177 will be actuated to print the desired character in the fourth column on the paper 176.

Another means of obtaining an error signal for a closed loop servo system is by an optical method. A thin cylindrical band can be cemented to a member which oscillates, such as a torsion bar, which has, for example, sixty-four evenly-spaced bright surfaces alternated with sixty-four dark areas. A preferred arrangement would have the circumferential length of a bright area equal to the circumferential length of a dark area. During operation of the mechanism, the effective dwells may be readily observed, using only a direct current light source, and will appear to the naked eye much the same as a steadily-rotating toothed wheel does under a stroboscopic lamp. By optically sensing an edge of the observed image, the effective dwell drift can create the required error signal. This system is inherently frictionless.

The intermittent motion device of the present invention can be embodied in other types of printers. For example, FIGURE 30 shows a type wheel 178 with a face 178a of approximately twice the width of the type wheel 10 previously described in connection with the serial printer embodiment (FIGURES 1 to 6 inclusive). Type characters 178b are arranged around the outer circumference in the form of a helix and undergo an effective dwell as each one comes into print position. The type wheel 178 is shown attached to a torsion bar 179 and can be arranged for oscillation with respect to a steady forward rotation by any of the mechanisms previously described.

The oscillating helical type wheel 178 has an average forward rotation, as does the straight type wheel 10 (FIGURE 2), but at the same time is advanced across the face of the printing medium, such as pressure-sensitive paper 180, along its axis of revolution by an amount equal to the pitch of the helix with each revolution of the type wheel 178.

For a right-hand character helix as shown in FIGURE 27, the direction of axial motion is indicated by the arrow 181. A print hammer 182 is constructed to print only one character at a time, regardless of its position on the helix. In order to accomplish the axial motion as indicated by the arrow 181, it is necessary that all elements of the intermittent motion device, including the type wheel 178, the torsion bar 179, and the print hammer 182 move together at the same rate of speed while the printing medium 180 remains stationary.

Therefore, each of the type characters 178b in one turn of the helix is brought opposite a fixed point on the printing medium 180 during one revolution of the type wheel 178. Successive revolutions of the type wheel 178 bring each of the type characters 178b opposite other fixed points on the printing medium 180, the points being spaced on intervals equal to the pitch of the helix.

One advantage of the helical type wheel 178 is that there is no lost time in indexing from column to column. The combination of the intermittent motion device of the present invention and the helical type wheel provides an apparatus with a much higher speed capability than one without the intermittent motion device. However, to make full use of the added speed, the print hammer 182 and its associated actuator (not shown) should be capable of "firing" and fully restoring in one character time. This is necessary when character "A" follows immediately after character "Z" on the helical type wheel 178, as shown in FIGURE 30, or where the column-to-column "jump" occurs on the character helix.

Another advantage of the oscillating helical type wheel 178 over a non-oscillating helical type wheel is that a type bar can replace the single print hammer 182 for medium speed application. The type bar would print all columns and does not move parallel to the axis of the helical type wheel 178. The helical type wheel 178 effective dwells allow additional time for the slower print capability of the type bar.

In a "strip printer," the printing medium moves instead of the printing mechanism, which is considerably easier than required for the serial printer arrangement described immediately heretofore. In a strip printer using the oscillating helical type wheel principle, the strip or paper tape advances uniformly from the printer, with no slow or dwell periods. The character print rate equals the average forward speed (r.p.m.) of the helical type wheel. The strip must advance a distance per revolution of the type wheel equal to the pitch of the helix.

The helical type wheel can also be embodied in a printing mechanism including an oscillating drum 183, having a number of character groups 178b arranged on identical helices, each with its associated print hammer 182. The oscillating drum 183 and its accompanying hollow torsion bar 184 are shown in phantom in FIGURE 30. The torsion bar 184 is broken at section line 185 but in reality must be firmly connected to the drum 183 by some arrangement such as that shown in FIGURE 28, for example. The axial motion of the oscillating drum 183 with helical character groups 178b is the same as that for the single type wheel 178, but the motion only continues for a distance which is approximately equal to the space between the helical character groups 178b in order to complete a line of print.

FIGURE 31 shows the intermittent motion device embodied in a typewriter or similar printing mechanism which forces the type faces into the printing medium, which is backed up by a platen. A type wheel 200 is vibrated torsionally with reference to a steady rotation by any of the means heretofore described, causing effective dwells of the type character 200a with respect to a platen 201. A torsion shaft 202 has a diameter largely dictated by the frequency ($f_n$) of oscillation of the type wheel 200. Therefore, in the medium speed range, this diameter becomes fairly small, and it becomes possible, by means of suitable mechanism (not shown), to apply a force indicated by the arrow 203 near the oscillating type wheel 200 and in such a manner as to deflect a type character 200a against the printing medium 204 and the platen 201 to effect printing. During the application of the force 203, the torsion bar 202 is subjected to bending in addition to the steady state oscillatory motion. It is necessary to advance the entire print mechanism, indicated generally at 205, a distance equal to the columnar spacing after each character is printed.

FIGURE 32 shows the intermittent motion device embodied in a "chain" printer which includes two sprockets 206 and 207 oscillating in unison, imparting a vibratory motion to the usual character-carrying chain 208. Therefore, the characters 208a will have an effective dwell exactly similar to the serial (FIGURES 1 to 6 inclusive) and drum (FIGURES 28 and 29) printer embodiments. Print hammers provided in a module 209 can be arranged as shown in FIGURE 32 or can be arranged inside the chain, firing character elements on the chain into a platen.

FIGURE 33 illustrates the intermittent motion device of the present invention using a magnetic "spring" system instead of a torsion bar "spring" system, arranged in the form of a modulated type drum. The device includes brackets 210 and 211 supporting excitation rotors 212 and 213, with the brackets being mounted on a base 214. The rotors 212 and 213 have excitation coils 212a and 213a, respectively, and, when energized, serve to excite oscillations of a drum 215 with respect to an inner cylinder 216.

FIGURE 34 shows an enlarged view of the rotor teeth 212b, which react with teeth 215c formed on the inner cylindrical surface of a stator 215b. The toothed member 215a is securely fastened to the drum 215. Similarly, FIGURE 34 applies to the excitation means at the right end of the drum, as shown in FIGURE 33. The excitation devices at each end of the drum 215 are similar in principle to those described in connection with the serial printer embodiment (FIGURES 1 to 6 inclusive) and the modulated drum (with torsion bars) embodiment (FIGURES 28 and 29) and serve to excite the drum 215 at its resonant frequency with respect to the cylinder 216.

The magnetic spring runs the full length of the cylinder 216, interrupted only by coils 217 used for energizing the magnetic circuit which forces magnetic flux through the teeth 216a on the cylinder 216 and the teeth of the member 215a on the inner surface of the drum 215. These teeth, used for the magnetic spring, may be constructed similarly to those used for the excitation devices at each end of the drum 215, but the number of teeth need not be related to the number of effective dwells desired per revolution of the cylinder 216.

For example, if it is required that the drum 215 make sixty-four effective dwells per revolution of the cylinder 216, it is necessary that the rotors 212 and 213 have sixty-four teeth 212b and 213b, respectively, but it is not necessary that there be sixty-four teeth 216a evenly spaced around the cylinder 126. Rather, the number of teeth on the drum 215 and the cylinder 216 can be optimized with relation to the angle of oscillation required to obtain the desired effective dwell to give the highest possible magnetic spring constant and highest frequency of oscillation of the drum 215 with respect to the cylinder 216. FIGURE 35 is an enlarged view of the magnetic spring teeth on both the cylinder 216 and the drum 215, with one of the teeth 215a shown phantomed in the extreme position of oscillation.

A pair of shafts 218 and 219 is shown as being pressed into the cylinder 216 and serves to locate the cylinder 216 for rotation by means of bearings 220 and 221. The bearings 220 and 221 are mounted in excitation rotors 212 and 213, respectively. Bearings 222 and 223, also journalled on the shafts 218 and 219, are mounted in excitation stator elements 215b and 215d, respectively, and serve to position the drum 215 for rotation with respect to the cylinder 216. The excitation stator elements 215b and 215d, preferably made of a magnetically "soft" material, form an integral part of the drum 215.

A pulley 224, mounted on the shaft 218 and driven by a belt 225, serves to drive the cylinder 216 essentially in a steady rotation. A bearing 226 gives added support for the shaft 218 in the vicinity of the pulley 224. It is desirable that the shaft 218 have some resiliency in torsion, since the inertia of the cylinder 216 cannot be made sufficiently high in relation to the drum 215 to act as a completely stable fly wheel; rather, the system operates as if about an invisible node, the oscillations of the cylinder 216 opposing the oscillations of the drum 215. Therefore, the required angle of oscillation for an effective dwell will be $\phi_1 + \phi_c$, where $\phi_c$ is the opposing maximum angle of oscillation of the cylinder 216, and the combined angle is the actual displacement angle between the drum 215 and the cylinder 216. The most desirable construction is to make the drum 215 inertia as low as possible and the inertia of the cylinder 216 as high as possible.

The resiliency of the torsional shaft 218 does not change the magnetic spring constant but does freely allow the opposed inertia reaction of the cylinder 216 to the drum 215 oscillation, thereby preventing the oscillation from carrying over to the drive belt 225.

Worms 227 and 228, journalled in the brackets 210 and 211, respectively, serve to fixedly adjust the excitation rotors, thereby allowing the operator to control the location of the effective dwell midpoint with reference to a fixed reference point.

The electrical energization of the coils 217 is provided through slip rings 229 operating in conjunction with brushes 230. Since the rotors 212 and 213 rotate only through a small angle, no slip rings are required for energization of the coils 212a and 213a.

The level of D.C. excitation of the coils 217 determines the value of the magnetic spring constant, while the level of D.C. excitation of the coils 212a and 213a determines the amount of excitation imparted to the system. Therefore, in this embodiment, there are three variables which must be controlled in order to obtain a given frequency and amplitude of oscillation: average forward speed of the drum, magnetic spring constant, and excitation energy.

One advantage of the magnetic spring system over the previously-described torsion bar spring system is that different drum speeds can be obtained by changing the magnetic spring constant. In addition, elimination of the torsion bars makes the device more compact and fabrication thereof simpler. The continuous spring action over the full length of the drum prevents rotation of one section of the drum relative to another.

The maximum frequency of the magnetic spring system is mainly limited to the obtainable magnitude of the magnetic spring constant.

Since all forces generated during oscillation are tangential, little sound is generated by the magnetic spring system when compared to the torsion bar systems. The torque relations of the magnetic spring depend on the design of the drum 215 and the cylinder 216 teeth, the material used, the intensity of magnetization, and so forth, and are not necessarily a linear function, as is the case with a torsion bar spring. Therefore, a non-linear torque versus angle of oscillation relationship can be designed into the system, thereby changing or improving the effective dwell characteristics.

It should be understood that the magnetic spring system has a resonant frequency and must be excited at that frequency by driving the cylinder 216 at the proper speed. The coils 217 must be excited with direct current to alternately form N and S poles, as shown in FIGURE 33. All the poles can be reversed, however, with no change in action. The coils 217 may be replaced with permanent magnet rings for a fixed speed system, thereby eliminating the I²R loss of the D.C. magnetic spring.

It is to be understood that the magnetic spring system may be applied to many structural designs of an intermittent motion device, as, for example, the serial printer embodiment (FIGURES 1 to 6 inclusive) and the motion picture projector embodiment (FIGURES 23, 24, and 26). Damping in the magnetic spring system takes the form of magnetic hysteresis and eddy current loss in the tooth area between the drum 215 and the cylinder 216.

Accordingly, while the forms of the invention shown and described herein are admirably adapted to fulfill the features and objects before enumerated, it is to be understood that it is not intended to confine the invention to the forms or embodiments disclosed herein, for it is susceptible of embodiment in various other forms without departing from the principle involved, and the invention is therefore claimed in any of its forms or embodiments all coming within the legitimate and valid scope of the claims which follow.

What is claimed is:

1. A device for intermittently advancing a record member, comprising
   rotatable drive means,
   an advancing roll mounted for movement by said drive means,
   means for continuously rotating said drive means at a substantially constant speed,
   and oscillating means for oscillating said drive means substantially at the resonant frequency of said device to cause said advancing roll to be oscillated, thereby advancing said record member intermittently.

2. A device for intermittently advancing a record member, comprising
   a torsion shaft,
   an advancing roll connected to said torsion shaft,
   means for continuously rotating said torsion shaft at a substantially constant speed,
   and oscillating means for oscillating said torsion shaft in torsion substantially at the resonant frequency of said device to cause said advancing roll to be oscillated, thereby advancing said record member intermittently.

3. A device for intermittently advancing a record member, comprising
   a torsion shaft,
   an advancing roll connected to said torsion shaft,
   means for continuously rotating said torsion shaft in the vicinity of its torsion node at a substantially constant speed,
   and magnetic oscillating means for oscillating said torsion shaft in torsion substantially at the resonant frequency of said device to cause said advancing roll to be oscillated, thereby advancing said record member intermittently.

4. A device for intermittently advancing a record member, comprising
   rotatable drive means,
   an advancing roll mounted for movement by said drive means,
   means for continuously rotating said drive means at a substantially constant speed in one direction,
   and magnetic oscillating means for oscillating said drive means substantially at the resonant frequency of said device to cause said advancing roll to be oscillated at an angle of oscillation which is in substantially constant ratio with said rotative speed of said drive means, said rotative speed of said drive means being in substantial constant ratio with the resonant frequency of said device, thereby advancing said record member intermittently a desired number of times for each revolution of said drive means.

5. A device for intermittently advancing a record member, comprising
   a torsion shaft,
   an advancing roll connected to said torsion shaft,
   means for continuously rotating said torsion shaft at a substantially constant speed in one direction,
   and magnetic oscillating means for oscillating said torsion shaft in torsion substantially at the resonant frequency of said device to cause said advancing roll to be oscillated at an angle of oscillation which is in substantially constant ratio with said rotative speed of said torsion shaft, said rotative speed of said torsion shaft being in substantially constant ratio with the resonant frequency of said device, thereby advancing said record member intermittently a desired number of times for each revolution of said torsion shaft.

6. A device for intermittently advancing a flexible record strip having sprocket perforations therealong, comprising a torsion shaft,
a sprocket wheel connected to said torsion shaft having sprocket pins engageable in the perforations of said record strip,
means for continuously rotating said torsion shaft at a substantially constant speed,
and means for oscillating said torsion shaft in torsion substantially at the resonant frequency of said device to cause said sprocket wheel to be oscillated, thereby advancing said record strip intermittently.

References Cited

UNITED STATES PATENTS

| | | | |
|---|---|---|---|
| 2,934,339 | 4/1960 | Davis | 226—156 |
| 3,130,594 | 4/1964 | Campbell | 74—84 |

H. HENSON WOOD, JR., *Primary Examiner.*

R. A. SCHACHER, *Assistant Examiner.*

UNITED STATES PATENT OFFICE
CERTIFICATE OF CORRECTION

Patent No. 3,389,843            June 25, 1968

William S. Touchman

It is certified that error appears in the above identified patent and that said Letters Patent are hereby corrected as shown below:

Column 8, line 46, after equation "(16)" insert -- , or --.
Column 16, line 5, in equation "(61)", "$\gamma$" should read -- $\gamma G$ --.
Column 21, line 6, in the equation, "$\phi$" should read -- $\psi$ --.
Column 23, line 69, in equation (89), before "$2J_2$" insert -- + --.

Signed and sealed this 25th day of November 1969.

(SEAL)
Attest:

Edward M. Fletcher, Jr.            WILLIAM E. SCHUYLER, JR.
Attesting Officer            Commissioner of Patents